US006987741B2

(12) United States Patent
Kelly et al.

(10) Patent No.: US 6,987,741 B2
(45) Date of Patent: Jan. 17, 2006

(54) SYSTEM AND METHOD FOR MANAGING BANDWIDTH IN A TWO-WAY SATELLITE SYSTEM

(75) Inventors: Frank Kelly, Walkersville, MD (US); David Kloper, Mt. Airy, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 1069 days.

(21) Appl. No.: 09/789,076

(22) Filed: Feb. 20, 2001

(65) Prior Publication Data

US 2001/0048670 A1    Dec. 6, 2001

Related U.S. Application Data

(60) Provisional application No. 60/197,246, filed on Apr. 14, 2000.

(51) Int. Cl.
H04B 7/212 (2006.01)
(52) U.S. Cl. .................. 370/321; 370/316; 455/13.2; 455/12.1
(58) Field of Classification Search ............... 370/321, 370/322, 348, 442, 443, 468; 455/450, 453
See application file for complete search history.

(56) References Cited

U.S. PATENT DOCUMENTS

| | | | |
|---|---|---|---|
| 4,526,925 A | | 7/1985 | Parker et al. |
| 5,559,809 A | | 9/1996 | Jeon et al. |
| 5,589,841 A | | 12/1996 | Ota |
| 5,760,739 A | | 6/1998 | Pauli |
| 5,797,083 A | | 8/1998 | Anderson |
| 5,812,545 A | | 9/1998 | Liebowitz et al. |
| 5,835,057 A | | 11/1998 | van Heyningen |
| 5,898,681 A | * | 4/1999 | Dutta .................... 370/229 |
| 5,963,862 A | | 10/1999 | Adiwoso et al. |
| 6,023,242 A | | 2/2000 | Dixon |
| 6,301,232 B1 | * | 10/2001 | Dutta .................... 370/321 |
| 6,366,761 B1 | * | 4/2002 | Montpetit ............... 455/12.1 |
| 6,377,558 B1 | * | 4/2002 | Dent ...................... 370/321 |
| 6,441,782 B2 | * | 8/2002 | Kelly et al. ............ 342/359 |
| 6,650,869 B2 | * | 11/2003 | Kelly et al. ............ 455/13.2 |

(Continued)

FOREIGN PATENT DOCUMENTS

EP    0 436 866 A    7/1991

(Continued)

OTHER PUBLICATIONS

Educational Networking in Newfoundland and Labrador. "Direcpc Installation Help" http://www.stemnet.nf.ca, 'Online! Oct. 19, 1999, XP002173458 Retrieved from the Internet: URL:htpp://www.stemnet.nf.ca/Training/sat-project/dpcwin95fin.htm 'retrieved on Jul. 7, 2001!*The whole document*.

(Continued)

*Primary Examiner*—Dang Ton
*Assistant Examiner*—Michael J. Moore
(74) *Attorney, Agent, or Firm*—Craig Plastrik

(57) ABSTRACT

A system for managing return channel bandwidth in a two-way satellite communication network is disclosed. A plurality of transceivers transmit backlog information over a return channel via a satellite, wherein the backlog information specify an amount of queued traffic for the respective transceivers. A hub receives the backlog information and allocates a minimal amount of return channel bandwidth to each of the transceivers. The hub selectively sets a bandwidth level associated with the return channel bandwidth that is available based upon one of a plurality of predetermined bandwidth levels according to a predetermined criteria. The hub selectively allocates additional return channel bandwidth based upon the bandwidth level to the transceivers that require additional return channel bandwidth in excess of the allocated minimal amounts.

24 Claims, 15 Drawing Sheets

U.S. PATENT DOCUMENTS

| | | | |
|---|---|---|---|
| 6,834,039 B1 * | 12/2004 | Kelly et al. | 370/229 |
| 6,842,437 B1 * | 1/2005 | Heath | 370/322 |
| 2003/0032429 A1 * | 2/2003 | Macridis et al. | 455/435 |

FOREIGN PATENT DOCUMENTS

| | | |
|---|---|---|
| EP | 0 725 456 A2 | 2/1996 |
| EP | 0 751 655 A2 | 6/1996 |
| EP | 0 734 140 A2 | 9/1996 |
| EP | 0 987 841 A2 | 3/2000 |
| FR | 2 762 936 A | 11/1998 |
| FR | 2 771 250 A | 5/1999 |
| GB | 2 320 162 A | 6/1998 |
| JP | 07086979 | 3/1995 |
| WO | WO 98/19403 | 5/1998 |
| WO | WO 98/29968 | 7/1998 |
| WO | WO 98/45964 A | 10/1998 |
| WO | WO 98/48593 | 10/1998 |
| WO | WO 99/09707 | 2/1999 |
| WO | WO 99/16201 | 4/1999 |
| WO | WO 99/16226 | 4/1999 |
| WO | WO 99/26422 | 5/1999 |
| WO | WO 99/49591 | 9/1999 |
| WO | WO 00/46669 | 8/2000 |
| WO | WO 01/80456 | 10/2001 |

OTHER PUBLICATIONS

Fukuyo et al: "Development of an Ultrasmall Satellite Communication Terminal Representing Telecommunications Isolation" NTT Review, Telecommunications Association, Tokyo, JP, vol. 9, No. 3, May 1997, pp. 120-125, XP00694473 p. 112.

Marel C: "VSAT Network Definition" Wiley Series In Communication and Distributed Systems, GB, Chichester, Wiley & Sons, 1995, pp. 1-47, XP002059665 ISBN: 0-471-95302-4 p. 27-p. 31; figure 1.18.

Gobbi R L et al: "Astrolink: An Evolutionary Telecommunications Venture" IEE Seminar on Broadband Satellite: The Critical Success Factors Technology, Services and Markets (Ref. No. 00/067), IEEE Seminar on Broadband Satellite: The Critical Success Factors Technology, Services and Markets, London, UK, Oct. 16-17 2000, pp. 9/1-9, XP001014417 2000, London, UK, IEE, UK paragraph '04.0!

Neale J et al: "Interactive Channel for Multimedia Satellite for Networks" IEEE Communications Magazine, Mar. 2001, IEE, USA, vol. 39, No. 3, pp. 192-198, XP002172693 ISSN: 0163-6804 *The whole document*.

Blefari-Melazzi N et al: "A Resource Management Scheme for Satellite Networks" IEEE Multimedia Scheme for Satellite Networks IEEE Computer Society, US, vol. 6, No. 4, Oct. 1999 pp. 54-63, XP000880604 ISSN: 1070-986X *Paragraph: System architecture*.

Ted Needleman: "Starband: Two-Way Satellite Broadband" PCMagazine, Jan. 2, 2001, XP002172694 *The whole document*.

"A Resource Management Scheme for Satellite Networks" Nicola Blefari-Melazzi and Gianluca Reali, University of Perugia, Italy, 1999, pp. 54-63.

* cited by examiner

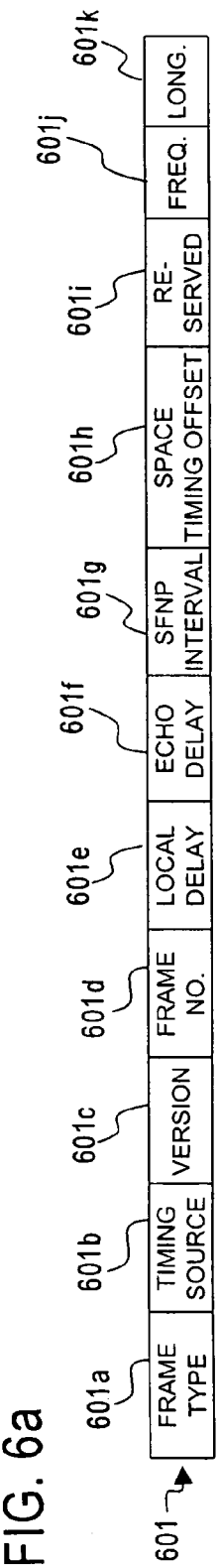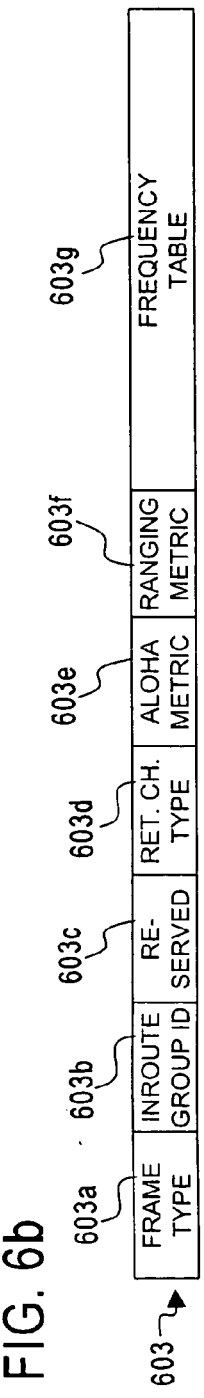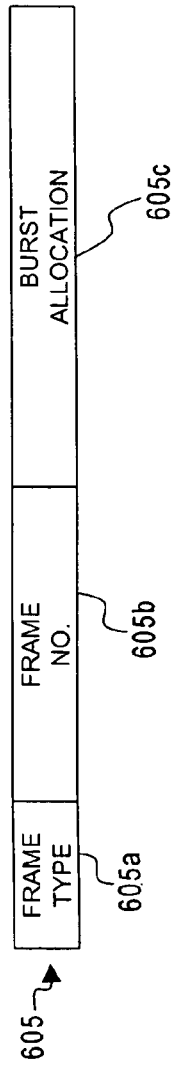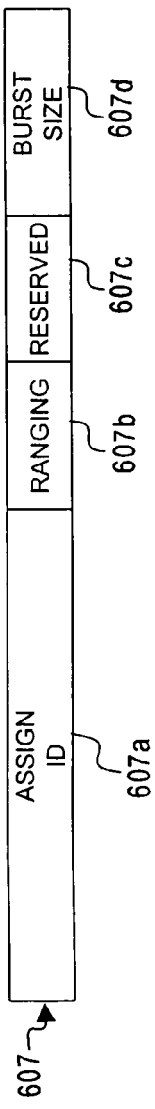
FIG. 6a
FIG. 6b
FIG. 6c
FIG. 6d

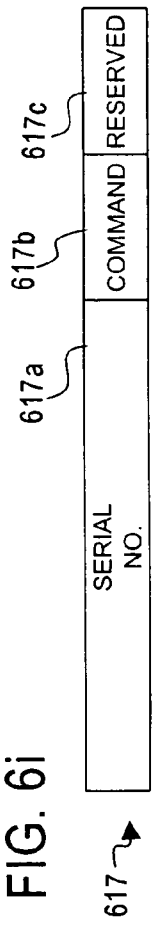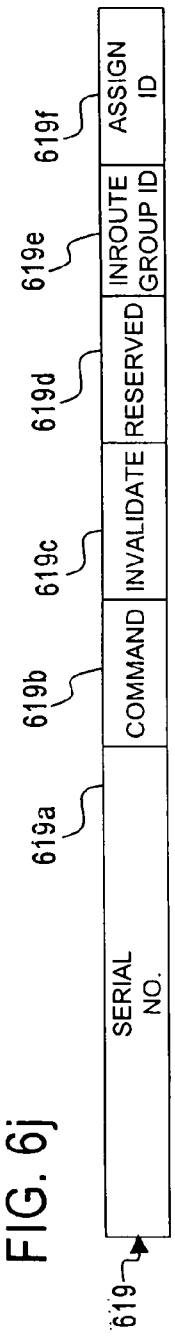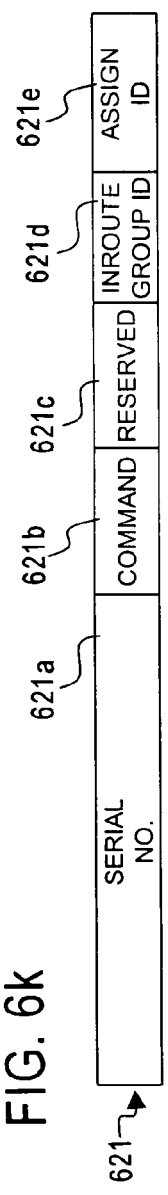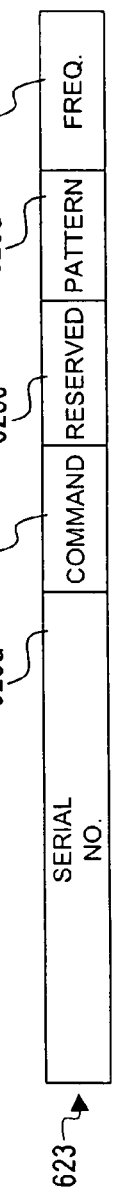
FIG. 6i
FIG. 6j
FIG. 6k
FIG. 6l

SYSTEM AND METHOD FOR MANAGING BANDWIDTH IN A TWO-WAY SATELLITE SYSTEM

CROSS-REFERENCES TO RELATED APPLICATION

This application is related to, and claims the benefit of the earlier filing date of U.S. Provisional Patent Application No. 60/197,246, filed Apr. 14, 2000, entitled "System and Method for Providing Control of a Two-way Satellite System," the entirety of which is incorporated herein by reference.

BACKGROUND OF THE INVENTION

1. Field of the Invention

The present invention relates to a satellite communication system, and is more particularly related to a two-way satellite communication system providing access to a packet switched network.

2. Discussion of the Background

Modem satellite communication systems provide a pervasive and reliable infrastructure to distribute voice, data, and video signals for global exchange and broadcast of information. These satellite communication systems have emerged as a viable option to terrestrial communication systems. As the popularity of the Internet continues to grow in unparalleled fashion, the communication industry has focused on providing universal access to this vast knowledge base. Satellite based Internet service addresses the problem of providing universal Internet access in that satellite coverage areas are not hindered by traditional terrestrial infrastructure obstacles.

The Internet has profoundly altered the manner society conducts business, communicates, learns, and entertains. New business models have emerged, resulting in the creation of numerous global businesses with minimal capital outlay. Traditional business organizations have adopted the Internet as an extension to current business practices; for example, users can learn of new products and services that a business has to offer as well as order these products by simply accessing the business's website. Users can communicate freely using a wide variety of Internet applications, such as email, voice over IP (VoIP), computer telephony, and video conferencing, without geographic boundaries and at nominal costs. Moreover, a host of applications within the Internet exist to provide information as well as entertainment.

Satellite communication systems have emerged to provide access to the Internet. However, these traditional satellite-based Internet access systems support unidirectional traffic over the satellite. That is, a user can receive traffic from the Internet over a satellite link, but cannot transmit over the satellite link. The conventional satellite system employs a terrestrial link, such as a phone line, to send data to the Internet. For example, a user, who seeks to access a particular website, enters a URL (Universal Resource Locator) at the user station (e.g., PC); the URL data is transmitted over a phone connection to an Internet Service Provider (ISP). Upon receiving the request from the remote host computer where the particular website resides, the ISP relays the website information over the satellite link.

The above traditional satellite systems have a number of drawbacks. Because a phone line is used as the return channel, the user has to tie up an existing phone line or acquire an additional phone line. The user experiences temporary suspension of telephone service during the Internet communication session. Another drawback is that the set-top box has to be located reasonably close to a phone jack, which may be inconvenient. Further, additional costs are incurred by the user.

Based on the foregoing, there is a clear need for improved approaches for providing access to the Internet over a satellite communication system There is a need to minimize costs to the user to thereby stimulate market acceptance. There is also a need to permit existing one-way satellite system users to upgrade cost-effectively. There is also a need to eliminate use of a terrestrial link. Therefore, an approach for providing access to a packet switched network, such as the Internet, over a two-way satellite communication system is highly desirable.

SUMMARY OF THE INVENTION

According to one aspect of the invention, a method is provided for managing return channel bandwidth in a two-way satellite communication system. The method includes receiving backlog information from a plurality of transceivers, wherein the backlog information specifies an amount of queued traffic for the respective transceivers. The method also includes allocating a minimal amount of return channel bandwidth to each of the plurality of transceivers, and selectively setting a bandwidth level associated with the return channel bandwidth that is available based upon one of a plurality of predetermined bandwidth levels according to a predetermined criteria. The method further includes selectively allocating additional return channel bandwidth based upon the bandwidth level to the transceivers that require additional return channel bandwidth in excess of the allocated minimal amounts. The above arrangement advantageously minimizes costs to the user, thereby stimulating market acceptance.

According to another aspect of the invention, a system is provided for managing return channel bandwidth in a two-way satellite communication network. A plurality of transceivers are configured to transmit backlog information over a return channel via a satellite. The backlog information specify an amount of queued traffic for the respective transceivers. A hub is configured to receive the backlog information and to allocate a minimal amount of return channel bandwidth to each of the plurality of transceivers. The hub selectively sets a bandwidth level associated with the return channel bandwidth that is available based upon one of a plurality of predetermined bandwidth levels according to a predetermined criteria. The hub selectively allocates additional return channel bandwidth based upon the bandwidth level to the transceivers that require additional return channel bandwidth in excess of the allocated minimal amounts This approach permits existing one-way satellite system users to upgrade cost-effectively.

According to one aspect of the invention, a system is provided for managing return channel bandwidth in a two-way satellite communication network. The system includes means for receiving backlog information from a plurality of transceivers. The backlog information specify an amount of queued traffic for the respective transceivers. The system also includes means for allocating a minimal amount of return channel bandwidth to each of the plurality of transceivers, and means for selectively setting a bandwidth level associated with the return channel bandwidth that is available based upon one of a plurality of predetermined bandwidth levels according to a predetermined criteria. Further, the system includes means for selectively allocating additional return channel bandwidth based upon the bandwidth level to the transceivers that require additional return channel bandwidth in excess of the allocated minimal amounts. The above arrangement advantageously provides compatibility with existing equipment.

In yet another aspect of the invention, a computer-readable medium carrying one or more sequences of one or more instructions for managing return channel bandwidth in a two-way satellite communication system is disclosed. The one or more sequences of one or more instructions include instructions which, when executed by one or more processors, cause the one or more processors to perform the step of receiving backlog information from a plurality of transceivers. The backlog information specify an amount of queued traffic for the respective transceivers. Other steps include allocating a minimal amount of return channel bandwidth to each of the plurality of transceivers, and selectively setting a bandwidth level associated with the return channel bandwidth that is available based upon one of a plurality of predetermined bandwidth levels according to a predetermined criteria. Yet another step includes selectively allocating additional return channel bandwidth based upon the bandwidth level to the transceivers that require additional return channel bandwidth in excess of the allocated minimal amounts. This approach advantageously eliminates use of a terrestrial link, thereby providing a convenient and cost-effective mechanism to access the Internet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention provides a two-way satellite system that eliminates the requirement for a phone line to support two-way applications and provides the ability to use dedicated high-speed return channels. The high-speed satellite broadcast system supports a Universal Serial Bus (USB) ready transceiver (i.e., adapter) that may be attached to a personal computer (PC) transmit data and to receive the satellite broadcast through a single antenna.

Although the present invention is discussed with respect to protocols and interfaces to support communication with the Internet, the present invention has applicability to any protocols and interfaces to support a packet switched network, in general.

Figure 1:
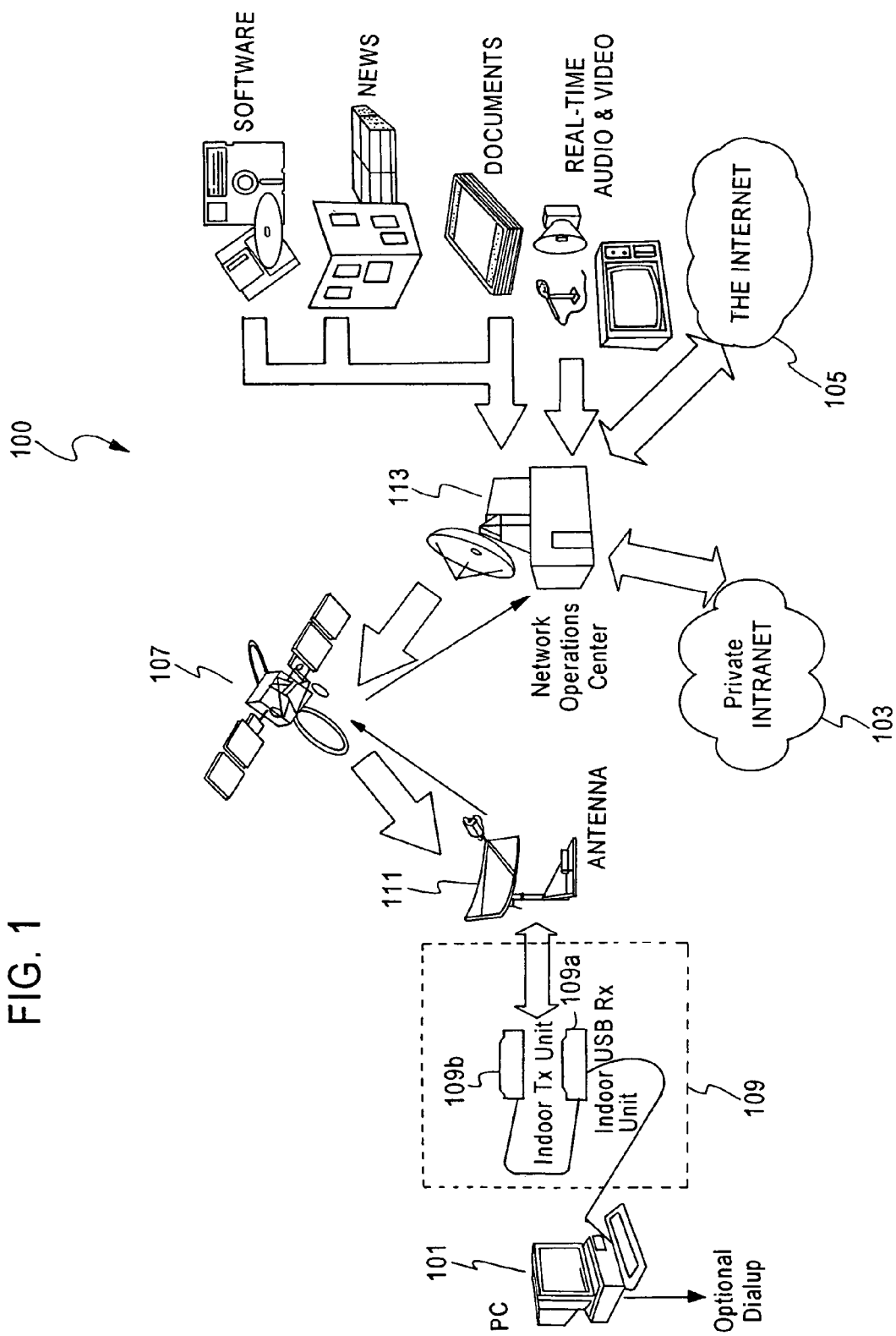
FIG. 1 is a diagram of a two-way satellite communication system configured to provide access to a packet switched network (PSN), according to an embodiment of the present invention.

FIG. 1 shows a two-way satellite communication system that is configured to provide access to a packet switched network (PSN), according to an embodiment of the present invention. A two-way satellite communication system 100 permits a user terminal, such as a PC 101, to access one or more packet switched networks 103 and 105 via a satellite 107. One of ordinary skill in the art would recognize that any number of user terminals with appropriate functionalities can be utilized; e.g., personal digital assistants (PDAs), set-top boxes, cellular phones, laptop computing devices, etc. According to an exemplary embodiment the packet switched networks, as shown, may include the public Internet 105, as well as a private Intranet 103. The PC 101 connects to a transceiver 109, which includes an indoor receiver unit (IRU) 109a, an indoor transmitter unit (ITU) 109b, and a single antenna 111, to transmit and receive data from a network hub 113—denoted as a network operations center (NOC). As will be explained in greater detail with respect to FIG. 4, the hub 113 may include numerous networks and components to provide two-way satellite access to PSNs 103 and 105. The user terminal 101 can transmit data to the NOC 113 with an uplink speed of up to 128 kbps, for example, and receive data on the downlink channel with speeds of up to 45 Mbps. As shown in the figure, the NOC 113 has connectivity to Intranet 103 and the Internet 105, and supports a multitude of applications (e.g., software distribution, news retrieval, document exchange, real-time audio and video applications, etc.), which may be supplied directly from a content provider or via the Internet 105.

Essentially, the system 100 provides bidirectional satellite transmission channels. The down-link channel from NOC 113 to the transceiver 109 may be a DVB (Digital Video Broadcast)-compliant transport stream The transport stream may operate at symbol rates up to 30 megasymbols per second; that is, the transport stream operates at bit rates up to 45 Mbps. Within the transport stream, the IP traffic is structured using multiprotocol encapsulation (MPE). One or more MPEG PIDs (Program IDs) are used to identify the IP (Internet Protocol) traffic. In addition, another PID is used for the framing and timing information.

The uplink channel from the transceiver 109 to the NOC 113 includes multiple carriers, each operating at speeds of 64 kbps, 128 kbps, or 256 kbps, for example. Each of these carriers is a TDMA (Time Division Multiple Access) stream, which employs several transmission schemes. Upon first use of user equipment, tools may be employed to provide initial access and to request further bandwidth as required. The specific bandwidth allocation scheme may be designed to ensure maximum bandwidth efficiency (i.e., minimal waste due to unused allocated bandwidth), and minimum delay of return channel data Further, the scheme is be tunable, according to the mixture, frequency, and size of user traffic.

The two-way satellite system 100 can be implemented, according to an exemplary embodiment, based upon an existing one-way broadcast system. The conventional one-way broadcast system utilizes a terrestrial link for a return channel. In contrast, the two-way satellite system 100 obviates this requirement. However, the user terminal 101 may optionally retain the dial-up connection as a back-up connection to the Internet 105.

According to one embodiment of the present invention, the two-way satellite system 100 offers the following services to the user terminal 101: digital package multicast delivery, multimedia services, and Internet access. Under the digital package delivery service, the system 100 offers a multicast file transfer mechanism that allows any collection of PC files to be reliably transferred to a collection of transceivers. The IP multicast service carries applications, such as video, audio, financial and news feed data, etc., for broadcast to the transceivers (e.g., 109). As already discussed, the system 100 provides high-speed, cost-effective Internet access.

To receive the broadcast from system 100, PC 101 may be equipped with a standard USB (Universal Serial Bus) adapter (not shown) and a 21-inch elliptical antenna 111. The system 100, according to one embodiment, uses a Ku- (or Ka-) band transponder to provide up to a 45 Mbps DVB-compliant broadcast channel from the NOC 113. Further, data encryption standard (DES) encryption-based conditional access can be utilized to ensure that the PC 101 may only access data that the PC 101 is authorized to receive.

In accordance with an embodiment of the present invention, the USB adapter may be attached to IRU 109a, which is connect to ITU 109b. The data is passed from the PC 101 to the USB adapter of the PC 101, which formats the data for transmission and provides both the control and data for the ITU 109a. The ITU 109a sends the data to an outdoor unit (ODU), which includes antenna 111, at the appropriate time for the data to be transmitted in TDMA bursts to equipment at the NOC 113. In this example, when averaged across a year, each two-way transceiver is expected to have a bit-error rate less than $10^{-10}$ more than 99.5% of the time whereby a single bit error causes the loss of an entire frame. The transceiver is more fully described later with respect to FIG. 3.

Figure 2:
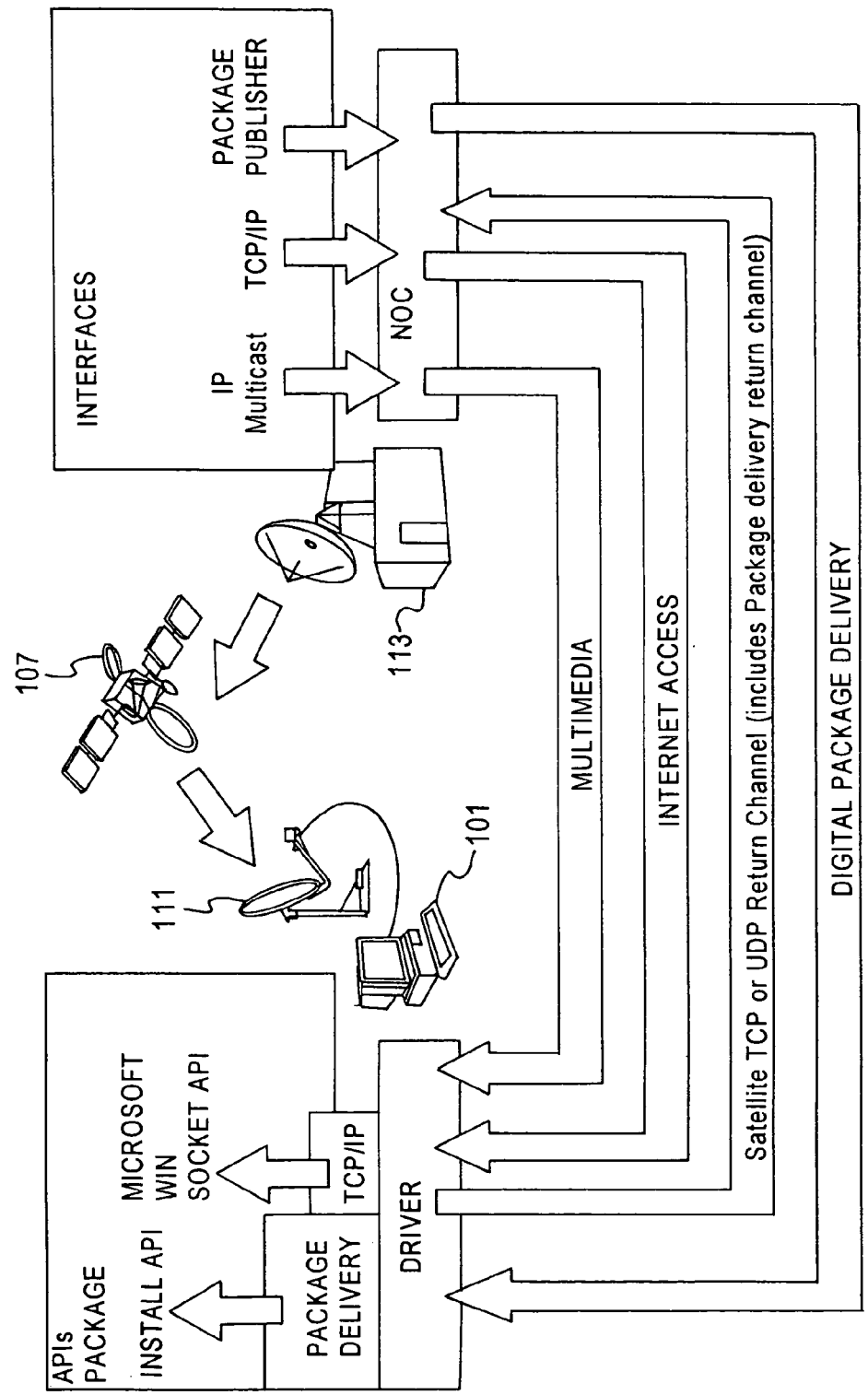
FIG. 2 is a diagram of the return channel interfaces employed in the system of FIG. 1.

FIG. 2 shows the return channel interfaces that are employed in the system of FIG. 1. The architecture of the two-way system 100 is an open architecture, which advantageously affords information providers control over their content. Specifically, the two-way system 100 provides interfaces to information providers at the NOC 113 and standard Application Programing Interfaces (APIs) on the host PC 101. The user terminal 101 is loaded with host software and drivers to interface with the transceiver 109 and to control antenna 111. The PC 101, in an exemplary embodiment, runs the following operating systems: Microsoft® Win98 Second Edition and Windows 2000. The PC software may provide instruction and support for installation and antenna pointing (including automatic registration and configuration), package delivery, and drivers that are used by the native TCP/IP (Transmission Control Protocol/Internet Protocol) stack to support standard applications—including Winsock API with multicast extensions and web browsers.

The two-way system 100 supports the exchange of digital packages to one or more receiving PCs. The term "package", as used herein, refers to any data (including electronic documents, multimedia data, software packages, video, audio, etc.) which can take the form of a group of PC files. Package delivery is used by an information provider to send packages to receiving PCs; for example, the delivery of digitized advertisements to radio and TV stations.

To prepare a package for transmission, a publisher (i.e., content provider) may merge the package's files into a single file using the appropriate utility (e.g., PKZIP), and subsequently load the package into the NOC 113 using an off-the-shelf file transfer mechanism (e.g., TCP/IP's file transfer protocol (FTP)). The publisher may control the following parameters associated with the package: addresses of the destination PCs, and delivery assurance. The low bit error rate and high availability of the two-way system 100 ensures that packages are delivered in one transmission (that is, without the need to retransmit).

With respect to ensuring proper delivery and reporting delivery status of the digital packages, the publisher possesses a number of functionalities. The PC 101 may issue retransmission requests, as needed, if segments of the package is loss or received with errors. The PC 101 may request retransmission of only the loss or corrupt portions of the digital package via the satellite return channel, or optionally, a dial-out modem It should be noted that the multicasting capability of the system 100 advantageously permits the one time retransmission of missing/corrupt data even though the missing/corrupt data may affect multiple PCs. The system 100 also supports delivery confirmation. A PC 101, after successfully receiving a package, may send a confirmation to a package delivery server (not shown) within the NOC 113. These confirmations are tabulated and provided in the form of reports to the publisher.

Further, the system 100 may provide a best effort service. Under this scenario, if frames are lost on the first transmission, the receiving PCs fill in the gaps on subsequent transmissions. This mechanism helps ensure high probability of delivery without requiring use of a return link for retransmission requests.

According to an exemplary embodiment, the digital packages contain the following fields: a transmission rate field that is configurable per package at speeds up to 4 Mbps through the IRU; a forward error correction (FEC) rate for providing correction of sporadic packet loss; a priority field for specifying low, medium, or high priority; and optional topic, descriptive name, and description fields that are used by the user interface of the receiver PC to present the package to the user. The package delivery service of the two-system 100 supports the simultaneous transmission of several packages and the preemption of lower priority packages to ensure the timely delivery of higher priority packages.

The system 100 also supplies multimedia services, which provide one-way IP multicast transport. The NOC 113 relays a configurable set of IP multicast addresses over the downlink channel. An information provider may pass IP multicast packets to the NOC 113, either via a terrestrial line or via the return channel. The receiving PCs may receive the IP multicast through the standard Winsock with IP Multicast extensions API. To prevent unauthorized access, each IP multicast address may be cryptographically protected. Thus, PC 101 may only have access to an address if it has been authorized by the NOC 113. Hardware filtering in the Indoor Receive Unit (IRU) 109a allows the reception of any number of different IP Multicast addresses.

The NOC 113, which provides network management functions, allocates to each multimedia information provider a committed information rate (CIR), and one or more IP multicast addresses. The CIR specifies the fraction of the broadcast channel bandwidth that is guaranteed to the data feed provider. Each IP Multicast address operates as a separate data stream that is multiplexed on the one broadcast channel.

As previously mentioned, the two-way system 100 provides high-speed Internet access, in which the PC 101 can connect to the Internet 105. In one embodiment of the present invention, the access is asymmetric, whereby the downlink channel from the NOC 113 to the user terminal 101 can be an order of magnitude greater that the uplink (or return channel).

An NDIS (Network Device Interface Specification) device driver within the PC 101 operates with the native TCP/IP stack for Windows. When the ITU 109b is active and enabled, the NDIS software sends the return channel data to the IRU 109a, which in turn supplies the data to the ITU 109b. However, when the ITU 109b is inactive, the packets may be alternatively sent to a dial-up interface. The two-way system 100 allows operation of the standard Internet applications; for example, Netscape® browser, Microsoft® Internet Explorer browser, email, NNTP Usenet News, FTP, GOPHER, etc.

Figure 3:
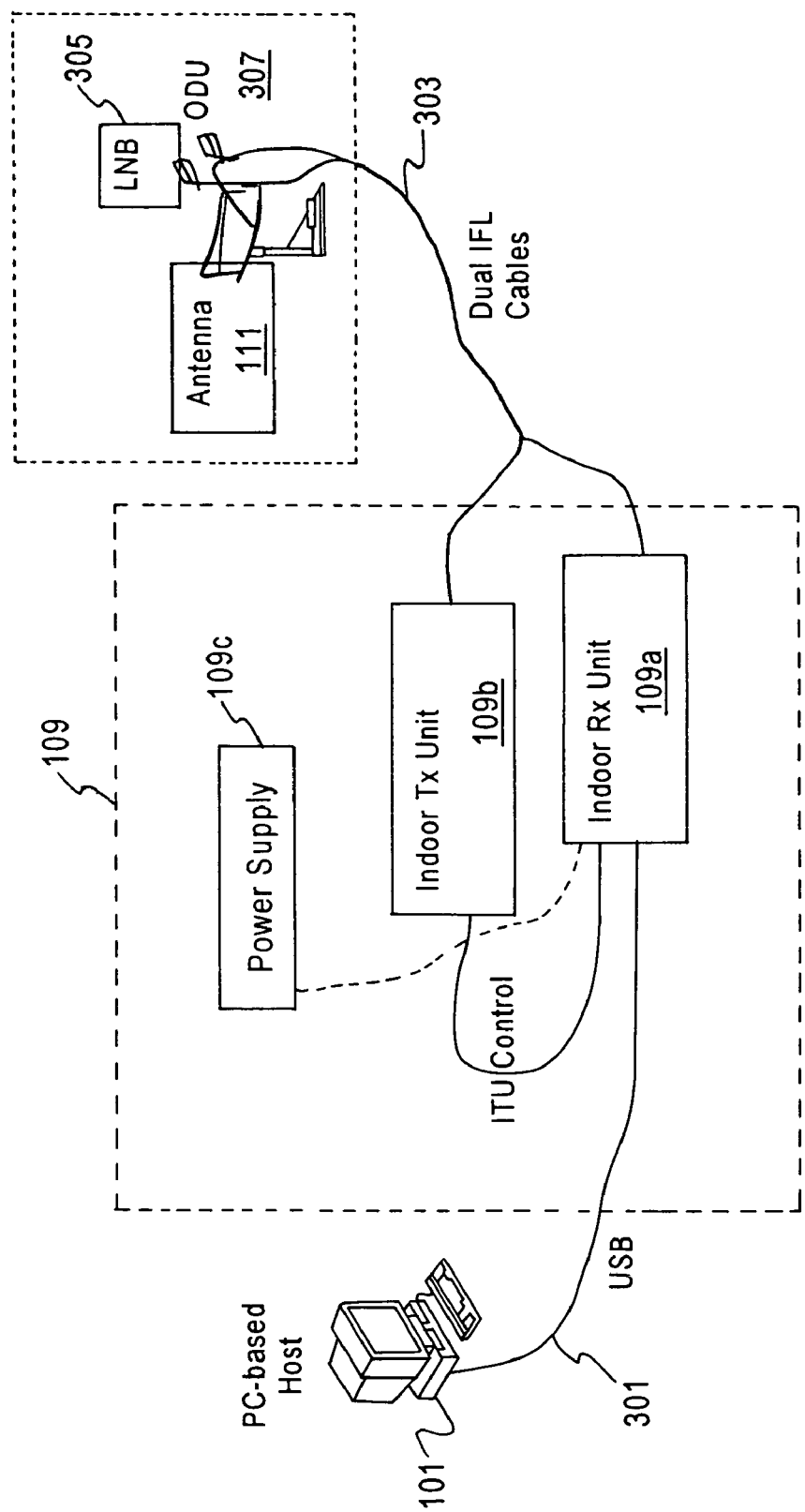
FIG. 3 is a diagram of the transceiver components utilized in the system of FIG. 1.

FIG. 3 shows the transceiver components utilized in the system of FIG. 1. The transceiver 109 encompasses a number of hardware and software components. A PC host software, which is resident in PC 101 and supports the satellite return channel. The transceiver 109 includes IRU 109a, ITU 109b, a power supply 109c, and connects to an Outdoor Unit (ODU) 307. The ODU 307 contains a low noise block (LNB) 305, antenna 111, and a radio (not shown). The IRU 109a operates in the receive-only mode and controls the ITU 109b.

As previously indicated, the IRU 109a may have a Universal Serial Bus (USB) interface, which is a standard interface to PC 101 to provide IRU control and data. The IRU 109a may be attached to the PC 101 dynamically, and may be loaded with operational software and initialized by PC driver software. Received traffic is forwarded to the PC 101 through the USB connection 301. The PC driver communicates with the IRU 109a for control over the USB channel. By way of example, the receive chain F-connector on an RG-6 cable is connected to the IRU 109a to communicate to the LNB 305. The IRU 109a contains an interface that may be used to transfer data to control the transmit unit and to actually provide the transmit data to the ITU 109b. A clock is received on this channel to ensure that transmit frame timing and transmit symbol clocks are synchronized.

The ITU 109b may be a standalone component that externally may appear very similar to the IRU 109a. According to one embodiment of the present invention, the housings of the IRU 109a and ITU 109b are in a stackable form factor. The ITU 109b has an IFL interface (not shown) that attaches to the ODU 307 via an RG-6 interface (not shown). Control information and data from the ITU 109b are multiplexed onto the IFL cables 303 to the ODU 307. One IFL cable 303 may handle the receive patch and the other may handle the transmit path.

Figure 4:
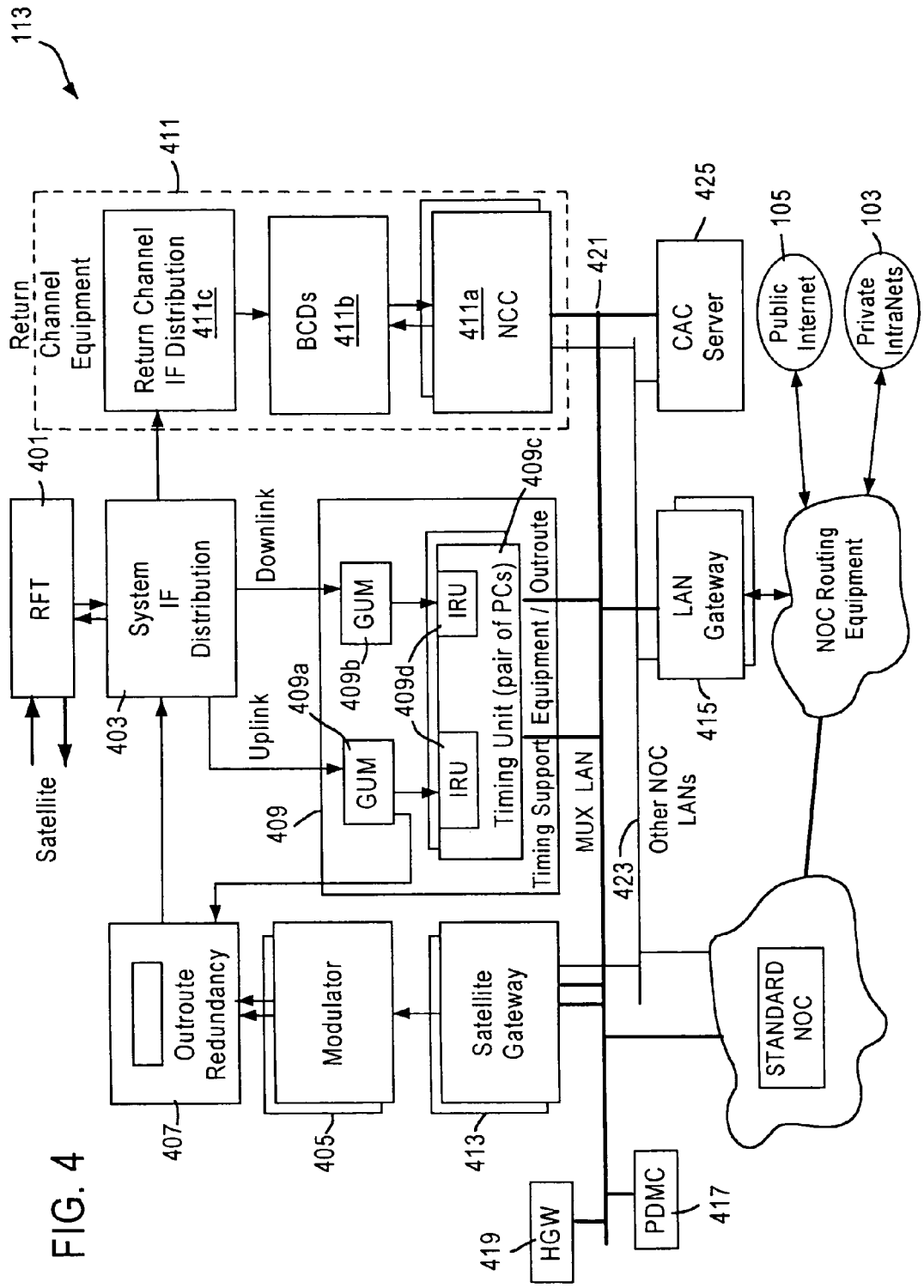
FIG. 4 is a diagram of the architecture of a network operations center (NOC) in the system of FIG. 1.

The ITU 109b also includes an ITU control interface for data transfer. In addition, a pulse is received over the ITU control interface to ensure that transmit frame timing and transmit symbol clocks are properly synchronized. The ITU 109b may contain an RF transmitter, low phase noise VC-TCXO, and serial data transceiver. ITU 109b modulates and transmits, in burst mode, the in-bound carrier at 64 kbps or 128 kbps to a Return Channel Equipment (FIG. 4). The ITU 109b may be designed to operate with and to be controlled by the IRU 109a. Although IRU 109a and ITU 109b are shown as distinct components, IRU 109a and ITU 109b may be integrated, according to an embodiment of the present invention. By way of example, a single DB-25 connector on the rear panel provides power, ground and a serial data link via which control of the transmitter is exercised. The ITU 109b may be considered a peripheral to the IRU 109a. Configuration parameters and inbound data from the IRU 109a may be input to the serial port (not shown); in addition, transmitter status information to the IRU 109a may output from the serial port.

The IRU 109a and ITU 109b utilize dual IFL cables 303 to connect to LNB 305 for receiving signals from the satellite 107. Each cable 303 may carry the necessary power, data, and control signals from the IRU 109a and ITU 109b to the LNB 305, which is mounted on the antenna 111. According to one embodiment, the antenna 111 is a standard 66 cm elliptical antenna, with dimensions of 97 cm×52 cm (yielding an overall size of approximately 72 cm). Antenna 111 may include mounting equipment to support an FSS feed, BSS feeds, and a feed bracket.

The transceiver 109 supports a variety of features that enhance the flexibility and efficiency of the two-way system 100. Transceiver 109 can be implemented as a receive-only unit that can be later upgraded to support a two-way configuration. In other words, the transceiver 109 may be configured either as a receive-only package or a transmit upgrade package. The transceiver 109 may be designed to be an add-on capability to a standard receive-only transceiver. Thus, in actual implementation, a user can either purchase an upgrade to a transceiver 109 to support a satellite-based return channel or can operate a receiver with no transmit portion for communication over the satellite 107. Such a receive-only system may employ a terrestrial return channel (e.g., phone line) for two-way IP traffic.

In addition, the transceiver 109 supports multiple rate, high speed, receive channel. The transceiver 109 can support for high speed TCP/IP applications using, for example, Turbo Internet™ TCP spoofing. In an exemplary embodiment, a standard USB interface to PC 101 is used to connect the PC 101 with the IRU 109a; however, it is recognized that any type of interface can be utilized (e.g., serial, parallel, PCM/CIA, SCSI, etc.). The transceiver 109 supports TCP/IP applications (e.g., web browsing, electronic mail and FTP) and multimedia broadcast and multicast applications using IP Multicast (e.g. MPEG-1 and MPEG-2 digital video, digital audio and file broadcast) to PC 101 per the USB adapter connection 301. The transceiver 109 can also support IP multicast applications (e.g., MPEG video and package delivery). Further, the transceiver 109 can provide compression of receive and return channel traffic to enhance bandwidth efficiency.

The transceiver 109 integrates the capabilities of the broadband receiver via satellite with the capability for a satellite return channel through the use of IRU 109a and ITU 109b. The IRU 109a is powered by power supply 109c. As indicated previously, the received channel to the transceiver 109 may be a DVB transport stream that contains multiprotocol-encapsulated IP traffic. A group of multiple transmit channels may be shared among several DVB transport streams.

Further, the transceiver 109, unlike conventional satellite systems, is controlled at the system level by the NOC 113. Particularly, the NOC 113 has the capability to enable and disable the operation of the ITU 109b, thereby making it difficult for an authorized user to access the satellite system 100. Neither the transceiver 109 nor the connected PC-based host 101 has the capability to override commands from NOC 113, even in the case in which the equipment is powered down and restarted. Once disabled, the ITU 109b can only be enabled by the NOC 113. That is, the user cannot "re-enable" a disabled ITU 109b, even through a power reset. Additionally, the NOC 113 may instruct the ITU 109b to transmit a test pattern at a pre-determined frequency. This process may not be overridden by the user, who has no capability to cause the generation of the test pattern. The user has no control over the frequency that the test pattern is sent. Thus, the above system-level control of the ITU 109b by the NOC 113 prevents users from utilizing the resources of the satellite system 100.

FIG. 4 shows the architecture of a network operations center (NOC) in the system of FIG. 1. A NOC 113 provides various management functions in support of the return channel from the user terminal 101. Specifically, the NOC 113 provides the high-speed receive channel to the transceiver 109 of user terminal 101. The NOC 113 also provides interfaces to either private Intranets 103 or the public Internet 105, as directed by user terminal 101. The NOC 113 can support multiple receive channels (referred to as outroutes) and multiple return channels; however, the NOC 113 can be configured to provide no return channels, depending on the application. Further, a single return channel may be shared by multiple receive channels. Multiple return channels within a single set of Return Channel Equipment (RCE) 411 can operate in conjunction to serve a single receive channel.

Within NOC 113, a Radio Frequency Terminal (RFT) 401 is responsible for retrieving an IF (intermediate frequency) output of a System IF Distribution module 403, up-converting the IF output signal to RF (radio frequency) for transmission to the satellite 107. Additionally, the RFT 401 receives from the satellite 107 an RF echo of the transmitted signal, along with the RF input for the return channels; the RFT 401 down-converts these signals to IF and forwards the down-converted signals to the System IF Distribution module 403.

The System IF Distribution module 403 receives as input an output signal from outroute modulators 405 via outroute redundancy equipment 407. In response to this input signal, the System IF Distribution module 403 sends a signal to the RFT 401 and a Timing Support Equipment module 409. The System IF Distribution module 403 receives an IF output from the RFT 401, and distributes the received IF signal to the Timing Support Equipment module 409 and the Return Channel IF Distribution module 411c.

The modulator 405 encodes and modulates the DVB transport stream from a satellite gateway 413. In an exemplary embodiment, at least two modulators 405 are used for each uplink for redundancy; i.e., support 1-for-1 satellite gateway redundancy. The modulator 405, which may be, for example, a Radyne® 3030DVB modulator or a NewTec® NTC/2080/Z modulator, is responsible for taking the outroute bit stream received from the satellite gateway and encoding it and modulating it before forwarding it towards the RFT 401.

The satellite gateway 413 multiplexes traffic to be transmitted on the uplink. The multiplexed traffic includes user traffic that is forwarded from standard LAN gateways 415 supporting TCP/IP Multicast traffic. The multiplexed traffic also includes traffic that is forwarded from the return channel components 411, which include a Network Control Cluster (NCC) 411a. The NCC 411a is a server-class PC running Windows, along with DVB satellite gateway software that supports multiple PIDs.

The outroute redundancy component 407 supports a configuration that allows critical traffic components to fail without causing a system outage; this is supported on the IF data following the modulator 405. If equipment on one transmit chain fails, the lack of a data signal is detected and a switch (not shown) automatically switches to another transmit chain. In this example, 1-for-1 redundancy of the satellite gateway 413 and modulators 405 is supported.

Within the outroute redundancy component 407, a gateway common equipment (GCE) (not shown) accepts input signals from two modulators 405, in which each serves one of two redundant chains for a return channel of system 100. The GCE provides an output interface to the system IF distribution module 403 for the currently online modulator 405. The GCE also has a control interface that can be used to switchover the modulator chain. By way of example, the GCE may have a "baseball switch" that can be used for manual switching. In an exemplary embodiment, the GCE may be a standard off-the-shelf GCE component per uplink. Optionally, a DVB GCE may be used if a single modulator 405 is be used instead of two per uplink.

The timing support equipment 409 includes multiple gateway up-link modules (GUMs) 409a and 409b. The GUMs 409a and 409b provide a translation of IF signals to L-band so the signals can be received on a receive-only unit, which controls a GCE switch (not shown) and on a timing unit 409c. The GUMs 409a and 409b receive a signal from the GCE and provides the L-Band signal either directly to a Quality Monitor PC (QMPC) (not shown) or through a splitter (not shown) to multiple receivers; one of these is connected to the system IF distribution module 403 for the uplink signal. The QMPC may be a standard receive-only version of the transceiver 109 with a relay card that controls the RCU. The QMPC, according to one embodiment of the present invention, may include a PC with the Windows operating system The QMPC can operate with the IRU 409d, thereby permitting the IRU 409d to be used in the QMPC. The IRU 409d may be able to support more channels because the data is not forwarded to the host and more MAC addresses are used. According to one embodiment, the addressing scheme for messages supports up to 16 million adapters (i.e., transceivers); extending beyond the private class "A" IP address. Accordingly, MAC addressing supports a greater number of adapters that IP addressing. The high order nibble of the byte, which is currently set to "0Ah" (10), may be used to give 16 fold improvement to 256 million adapters.

A Redundancy Control Unit (RCU) (not shown) within the outroute redundancy component 407 controls the GCE switch. The RCU interfaces to the QMPC, which provides a control channel that triggers the switching of the GCE. The RCU also includes an interface to the GCE for controlling the switch. Further, the RCU has serial interfaces that interface to the satellite gateway 413 to indicate which satellite gateway is currently online, thereby ensuring that only the online satellite gateway provides flow control to the gateways.

Several local area networks (LANs) 421 and 423 may be used to connect the various NOC components together. A Mux LAN 421 is used to multiplex traffic that is to be sent to the satellite gateway 413 for a specific outroute. A Traffic LAN 423 transports customer traffic that are received from the return channel and traffic from the Intranet 103 and Internet 105.

The NOC 113 can maintain several standard gateways 415, 417, and 419 that may forward data to the user terminal 101 over LAN 421. These gateways 415, 417, and 419 may operate on server-class PCs running Microsoft® Windows-NT. A PDMC (Package Delivery and IP Multicast) Gateway 417 forwards package delivery traffic and IP multicast traffic to the satellite gateway 413. The gateway 417 uses key material provided by the conditional access controller (CAC) server 425 to instruct the satellite gateway 413 whether to encrypt the traffic as well as the key to be used for encryption.

A Hybrid Gateway (HGW) 419 processes two-way TCP traffic to the users. The HGW 419 provides uplink traffic, handles flow control to respond to satellite channel overload, and also acts as a proxy for return channel traffic. For user terminals 101 that generate TCP traffic for transmission over the return channel, the HGW 419 interacts with the public Internet 105 or private Intranet 103 to relay the received user traffic. The software of the HGW 419 may be modified to support the networking functionalities associated with a satellite-based return channel. The software supports variable round-trip times in the throughput limiter calculations; e.g., either a CIR-based or more intelligent round-trip-time based algorithm may be deployed. TCP Selective acknowledgement may also be supported by the software to minimize retransmission data requirements. Other functionalities of the software include TCP Delayed ACK, larger transmission windows, and HMP overhead reduction. Further, the software support return channel units that are "always on". In addition, the software is backwards compatible.

A Dedicated LAN Gateway (LGW) 415 includes the functionality of both the PDMC 417 and HGW 419. The LGW 415 is used for customers that require a dedicated amount of bandwidth, in which the customers are permitted to share the bandwidth among their different applications.

A Conditional Access Controller (CAC) server 425 contains the key material for all of the transceivers 109. According to one embodiment of the present invention, uplink traffic is encrypted using keys from this server 425. Alternatively, the receive channel may be unencrypted. The return channel traffic could also be encrypted with the transceiver's individual key for privacy of data. Multicast traffic is encrypted with a generated key. The CAC server 425 ensures that the key material is provided to the transceivers 109 that are authorized to receive any broadcasts. In addition, the server 425 provides the individual transceiver keys to the gateways 415, 417, and 419. The CAC server 425 operates on a server-class PC running Windows NT.

The NOC 113 also contains a Return Channel Equipment module (RCE) 411, which manages the return channels associated with NOC 113. That is, the RCE 411 is responsible for managing return channel bandwidth and for receiving the return channel traffic from the transceivers 109. The RCE 411 may include Network Control Clusters (NCCs) 411a, one or more Burst Channel Demodulators (BCDs) 411b, and are responsible for managing the return channel bandwidth and the BCDs 411b. According to an exemplary embodiment, each RCE 411 has a limit on the number of BCDs 411b which an RCE 411 can support. For example, given a 1-for-7 redundancy scheme, up to 28 return channels can be supported. By way of example, multiple RCEs 411 may be deployed to support more than 32 BCDs 411b worth of return channels. As will be discussed later with respect to FIG. 10, this approach provides a scalable configuration.

The NCC 411a may be configured to control several RCEs 411. The site may be assigned to the NCC 411a at ranging time. "Ranging" is a process which configures a site on a NCC 411a and adjusts timing of the NCC 411a without user intervention. Sites may periodically either be moved to another NCC 411a, which supports a different set of return channels or may be completely decommissioned from the NOC 113. For instance, a site may be moved to another NCC 411a, as needed, for load balancing. The system 100 is capable of communicating site moves between NCCs 411a so the sites are no longer enabled on the prior NCC 411a. In addition, a de-commission of the site from the CAC server 425 may disable the site at the NCC 411a. According to one embodiment of the present invention, the NCC 411a can access the same database (not shown) as that are used by the conditional access and auto-commissioning systems.

The RCE 411 further includes Burst Channel Demodulators (BCDs) 411b, which demodulates return channel transmissions from the transceivers 109 and forwards the received packets to the NCC 411a. Redundancy of the IF subsystem is supported in the BCDs 411. These BCDs 411b are one for N redundant with automatic switchover in the event of a failure. According to an exemplary embodiment, up to 32 BCDs may be supported by a single NCC 411a; the RCE 411 may handle up to 32 BCDs (i.e., up to 31 return channels).

The RCE 411 also contains a Return Channel IF Distribution module 411c. The return channel IF Distribution module 411c receives the IF output signal from the System IF Distribution module 403 and forwards the output signal to the BCDs 411b. The sites may be "polled" to ensure that the BCDs 411b stay active, thereby proactively detecting failed sites.

As noted above, NCC 411a is responsible for managing the bandwidth of a set of up to 32 BCDs 411b. NCC 411a also provides configuration data to the BCDs 411b. NCC 411a also reassembles packets received from the return channels (by way of the BCDs 411b) back into IP packets and forwards the IP packets to the appropriate gateway. The NCC 411a is internally 1-for-1 redundant between the two NCCs 411a by exchanging messages.

When a frame is received from a receiver, the first byte of data may indicate the Gateway ID for this serial number. The received frame may be mapped to an IP address by the NCC 411a and stored for the particular individual receiver. Accordingly, other packets can be received by this receiver without the 1-byte overhead for the gateway on every packet. The NCC 411 forwards the packet to the appropriate gateway after building an IP-in-IP packet that is compatible with the UDP tunneled packets sent to the gateways.

According to one embodiment, the NCC 411a may utilize the Microsoft® Windows operating system The NCC 411a need not processes or transmit frame timing messages. The NCC 411a may support changing the format of outbound messages to include new MAC addresses as well as different return channel headers. In addition, NCC 113 tracks return channel gateway address to IP mapping; this information is periodically provided to receivers. NCC 411a may also update and effect BCD configuration files, which can be locally stored and managed, without software restart. NCC 411a can support a large number of transceivers 109 (e.g., at least 100,000 transceivers).

As indicated previously, the NCC 411a manages the return channel bandwidth and forwards inbound traffic to the gateways. The NCC 411a may send a timing pulse to its associated timing units 409c once every "super frame" before the NCC 411a pulses the BCDs 411b to receive the frame. These pulses are provided to the timing units on the return channel frame boundary.

NCC 411a further maintains a transceiver-last-packet-time in a large memory-based sorted array for polling. The polling algorithm poll sites that are not recently transmitting or, as needed, to poll known "good" sites to keep BCDs 411b active. That is, the NCC 411a performs remote polling of idle remotes on a periodic basis to keep BCDs 411b active. The polling message specifies the return channel number to respond on. The remote status assumed to be good if the remote has transmitted packets. Only the least-recent responders are polled. NCC 411a can disable transmission from sites with particular serial numbers through its broadcast.

The Timing Support Equipment (TSE) 409 provides return channel timing support for each outroute. TSE 409 may employ a pair of PCs (not shown); each PC runs Microsoft® Windows and are connected to two IRUs 409d. According to one embodiment of the present invention, a NCC 411a is allocated to one of the outroutes to ensure a 1-to-1 relationship between NCC 411a and timing support equipment 409. For each outroute pairing, the TSE 409 may include a pair of Gateway Upconverter Modules (GUMs) 409a and 409b, and a timing unit 409c. The GUMs 409a and 409b translate the uplink and downlink IF signal to an L-band signal. The uplink signal is sent to a pair of local timing units 409c as well as the outroute redundancy equipment 407. The downlink signal is sent to a pair of echo timing units. The timing unit 409c determines both the variable satellite gateway delay for the transmit signal and the NOC satellite delay, and transmits frame timing information to the transceivers 109.

The timing units 409c are the portion of the NOC 113 that support network timing. In an exemplary embodiment, a timing unit 409c may be a PC with two attached indoor receive units (IRUs) 409d, both which are configured to support timing. When the timing unit 409c receives the local timing, timing unit 409c may generate a "frame timing" message with the prior super frame satellite delay and the current super frame delay. The timing unit 409c transmits the message to the satellite gateway 413 in an appropriated formatted Traffic Token Ring (TTR) message. Software in the PC may be used to configure the IRUs 409d in this mode; a special version of firmware may also be provided to the IRU 409d. One of the IRUs 409d may provide a time difference from the pulse to the local super frame header, while the other IRU 409d may provide the difference from the pulse to the super frame after the IRU 409d is sent to the satellite 107 and received back at the NOC 113. Further, one IRU 409d receives the transport stream for the outroute prior to transmission to the satellite 107. The other IRU 409d receives the transport stream after the transport stream is transmitted to and received back from the satellite by way of an L-Band output from the downlink GUM 409b.

IRUs 409a may include hardware to support network timing. The software of the timing unit 409c may use this hardware to perform the necessary timing unit functions. A timing support task may be included in the embedded software, which operates in the IRU 409d portion of the Timing Unit 409c. The host software may receive timing information from the firmware and may use the information to format frame timing messages. The frame timing messages may be sent to the satellite gateway 413 through the MUX LAN 421 using a TTR.

The system 100 also measures and reports usage information on the channels. This information may be supplied on a periodic basis to billing, and/or made available on a real-time basis to management nodes in the NOC 113 for troubleshooting and monitoring purposes.

Figure 5A:
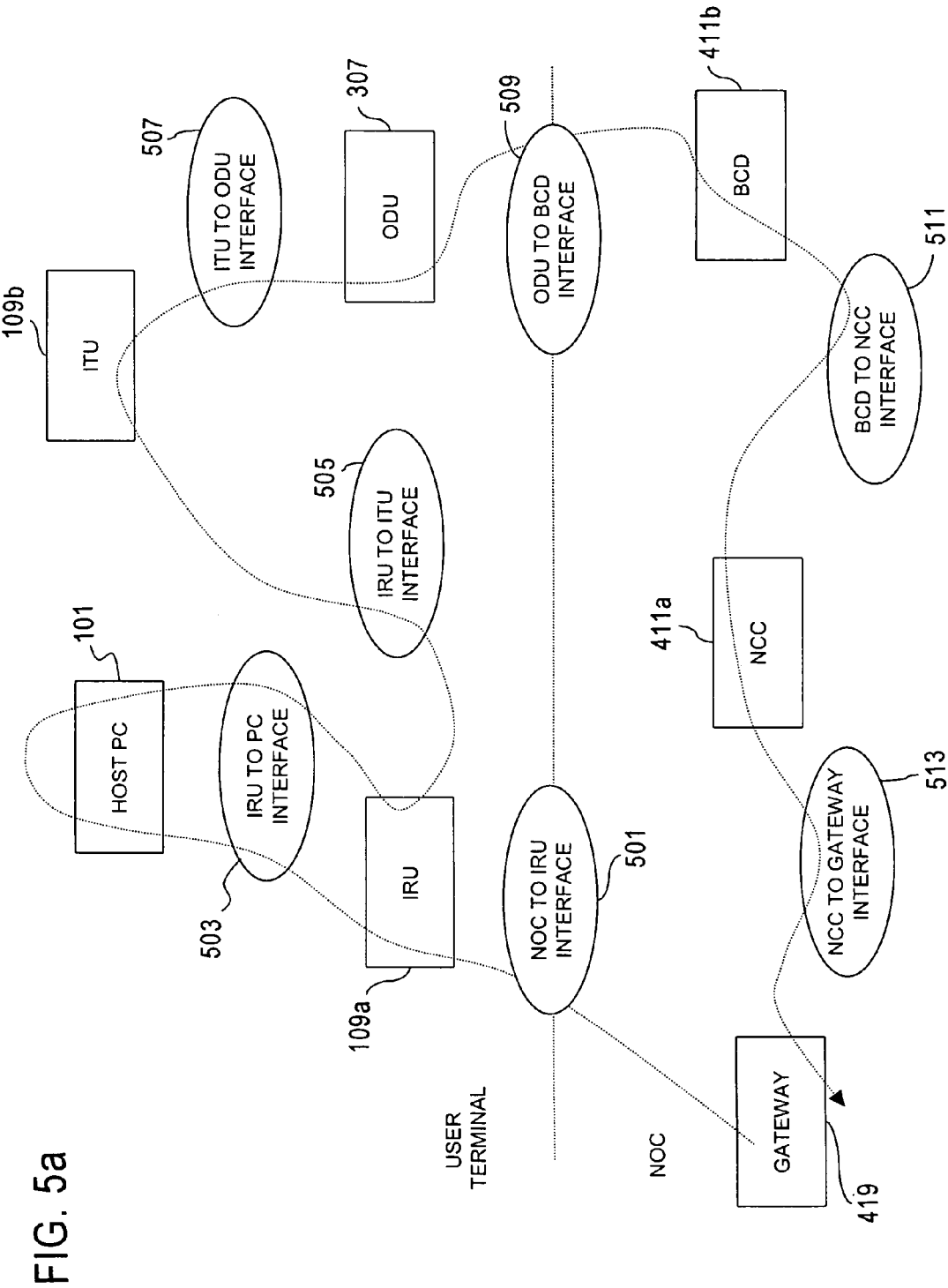
FIGS. 5a and 5b show a diagram of the system interfaces and packet formats, respectively, that used in the system of FIG. 1.

FIG. 5a shows the system interfaces that are involved with the round trip flow of user traffic through the system of FIG. 1. The system interfaces permit transceiver 109 to operate without requiring configuration information from the host 101. According to one embodiment of the present invention, NOC 113 sends transceiver 109 the necessary information to control and manage the transceiver 109. In this example, user traffic originates from a gateway 419, which is a hybrid gateway, to IRU 109a. The traffic is sent to the host PC 101, which can initiate traffic through IRU 109a, ITU 109b, and then ODU 307 for transmission over the return channel. The user traffic is received by the NOC 113 via BCD 411b. The BCD 411b forwards the traffic to NCC 411a to the Internet 105 or Intranet 103 via gateway 419.

The communication among the components 419, 109a, 101, 109b, 307, 411b, and 411a is facilitated by the following interfaces: NOC to IRU Interface 501, IRU to PC Interface 503, IRU to ITU Interface 505, ITU to ODU Interface 507, ODU to BCD Interface 509, BCD to NCC Interface 511, and NCC to Gateway Interface 513. The NOC to IRU interface 501 is layered to include DVB, PIDS, and MAC addresses. The IRU to PC Interface 503 uses USB super frames to send a large amount of data in a USB burst to the host PC 101. The payloads of the super frames are IP datagrams with the IP header. A new format header may be used for each message to provide timing and other information to the host PC 101. In the IRU to ITU interface 505, the IRU 109 may break the IP datagram into bursts to transmit to the NOC 113. The IRU 109 may send a frame format message for each frame if there is data to transmit.

The internal NOC interface, IRU to BCD interface, is layered to include the burst structure, the return channel frame format, and the message structure for NCC 411a messages. The NCC 411a may forward traffic to the appropriate gateway 419 (e.g., dedicated gateway or hybrid gateway) in the NOC 113. The data forwarded to the gateway 419 may be reformatted in a UDP datagram to allow the NOC 113 to receive the traffic as if it were received over a UDP return channel.

The NOC to IRU interface 501 may utilize a multi-layer protocol, which includes the following layers: a DVB transport stream, which can support multiple multiprotocol encapsulation messages, for example, in a single MPEG frame per the implementation and includes fixed-size 204 byte MPEG packets (which contain 188 bytes of user traffic and 16 bytes of FEC data); a DVB PID, which the receiver may filter traffic based on PIDs; and a DVB MPE, which the receiver may filter traffic based on MAC Address and may process MPE headers for user traffic. The receiver may also process service tables for PAT and PMT; data following the MPE header has been added to support encrypted traffic. The multi-layer protocol of the NOC to IRU interface 501 may include an IP Payload (the payload of the MPE is expected to be an IP packet including IP headers) and RCE Messages. It should be noted that specific MAC addresses may be used for return channel messages, which may originate from the NCC 411a or from a timing unit 409c.

With respect to the DVB transport stream, the DVB standard multiprotocol encapsulation standard over data piping is employed. The multiprotocol header includes the following fields used by system 100: a MAC Address field (e.g., 6 bytes in length); an encryption field (e.g., a 1 bit field that can be set if the packet is encrypted); and a length field for specifying the length of the packet header. If encryption is disabled for the packet, the IP header and payload immediately follow the MPE header. If encryption is enabled, then the first 8 bytes contain the initialization vector for packet decryption. This vector includes a packet sequence number used to detect out-of-sequence packets. The satellite gateway 413 removes packets from the TTR buffers and transmit them on an outroute. The payload and padding are transmitted following an appropriately formatted MPE header and the initialization vector (for encrypted packets). The payload of the multiprotocol encapsulation frame is determined by the encryption value in the MPE header. If encryption is enabled for the packet, then the first 8 bytes contain an initialization key that also acts as the sequence number. If encryption is disabled, the packet is the IP payload, which is DVB compliant.

As indicated above, the NOC to IRU interface 501 may use DVB compliant MPEG-2 formatting. The header of each frame contains a PID, which is filtered by the receiver hardware. The receiver is capable of receiving several of the PID addresses. The receiver may be configured with the PID addresses it is to use, including the one to be used for its NCC 411c. Each NCC 411c may be allocated its own private PID to ensure that receivers only receive traffic for their allocated NCC 411c. A TTR buffer may be used by the gateways, the NCC 411a, the Local Timing Unit, and the CAC Server to send messages to the satellite gateway for transmission on the outroute.

Figure 5B:
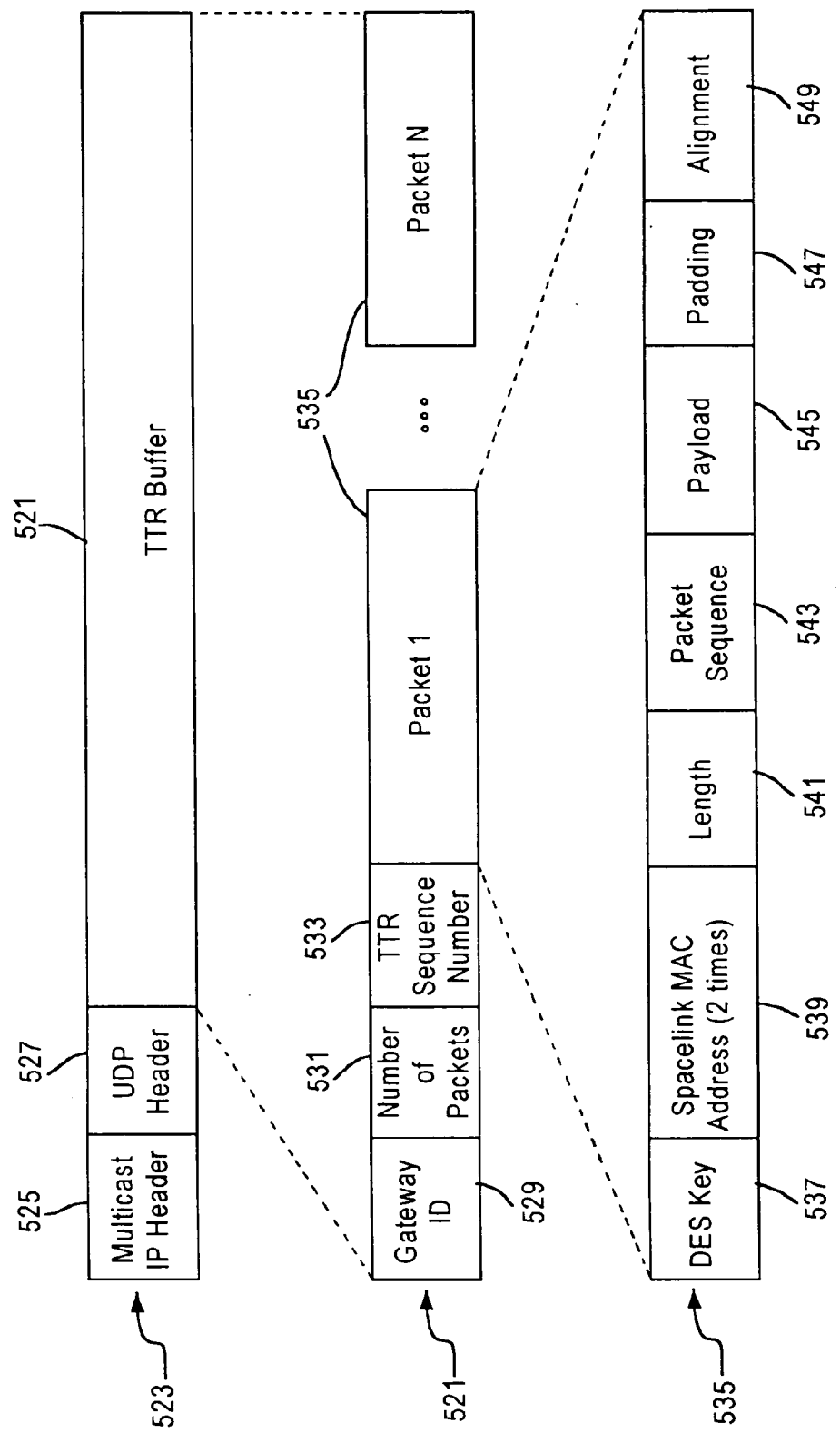

As shown in FIG. 5b, a TTR buffer 521 is carried as the data field of a multicast UDP/IP packet 523, which includes a multicast IP header 525 and a UPD header 527. The TTR buffer 521 includes the following fields: a Gateway ID field 529 (8 bits) for specifying the sending gateway ID; a Number of Packets field 531 (8 bits) for indicating the number of packets in this TTR buffer; and a TTR Sequence Number field 533 (16 bits) for specifying the sequence number. The TTR Sequence Number field 533 is used by the satellite gateway 413 (in conjunction with the Gateway ID) to detect TTR buffers lost on the backbone LAN. The TTR Sequence Number field 533 is sent least significant byte first; a value of 0 is always considered to be in sequence. The TTR buffer 521 also includes N packets 535. Within each packet 535 are the following fields: a DES Key field 537, two MAC Address fields 539, a Length field 541, a Sequence Number field 543, a Payload field 545, a Padding field 547, and an Alignment field 549. The DES Key field 537, which is 8 bytes in length, specifies the encryption key to be used by the satellite gateway 413 to encrypt the packet 523. When no encryption is required (e.g., for NCC 411a packets), zero is placed in this field 537. Two copies of the MAC Addresses (each have a 6-byte length) are stored in field 539. The first copy is the spacelink MAC address placed in the DVB Header. The second copy of MAC Address is supplied for backward compatibility. The Length field 541 (2 bytes) indicates the length of the packet 535 (least significant byte first). The Sequence Number field 543 indicates the packet number of this Next TTR frame. In an exemplary embodiment, the Payload field 545 has a variable length from 1 to 8209 bytes and stores the message that is to be sent on the outroute (e.g., an IP packet). The length of the Payload field 545 may be limited to the maximum Ethernet frame size, for example. The Padding field 547, which may vary from 0 to 3 bytes, makes the packet 535 a multiple of long words when transmitted on the outroute; this is required for proper DES encryption. The Alignment field 549 is a 2 byte field and provides filler between packets, ensuring that the next packet starts on a 4 byte boundary. The Padding field 547, in an embodiment of the present invention, leaves the packet 535 2 bytes short of the proper boundary to optimize satellite gateway 413 processing of the TTR buffer 521.

The total size of a TTR buffer is only limited by the maximum data field size of the UDP packet 523. Typically, a maximum UDP packet size of 8192 or 16234 is used on the backbone LAN. Gateways need to forward data at high speed and typically send large TTR buffers with multiple IP packets in them. The CAC Server 425 does not need to send at high speed but does send multiple packets in TTR buffers for efficiency. NCCs 411a and the Local Timing Unit send messages at a much lower rate than the IP Gateways and typically may only send one message in each TR buffer in order to reduce latency and jitter.

Each sender of outroute messages in the NOC 113 may be assigned a unique Gateway ID for each of the traffic streams it may forward to the satellite gateway 413. The NCC 411a, Local Timing Unit 409c, and the CAC Server 425 are each assigned a single Gateway ID. Gateways handling unicast traffic may be assigned two Gateway IDs for their unicast traffic to support prioritization of interactive traffic ahead of bulk transfers.

The satellite gateway 413 may use the Gateway ID to map an incoming TTR buffer 521 to the correct priority input queue. satellite gateway 413 can support up to 256 senders. The NCC 411a, Local Timing Unit 409c, and CAC Server 425 traffic should be prioritized ahead of all user traffic. This is necessary to ensure minimal propagation delays and also because these traffic types have very low throughput. The NCC 411a should be prioritized ahead of all other traffic to ensure that the super frame header is transmitted as soon as possible to ensure that the return channel timing is received in time at the transceivers.

The following types of addresses may be used within a Return Channel of system 100: Ethernet MAC addresses; IP unicast addresses; and IP multicast addresses. For most IP based communication, UDP is used on top of IP. All references to communication using IP (unicast or multicast) addresses, also imply the use of an appropriate (configurable) UDP port number. In some cases, for example, the conditional access IP multicast address and the flow control IP multicast address, the same specific IP address may be used with different UDP port numbers.

Each LAN port in the NOC 113 has an Ethernet MAC address assigned to it. The Ethernet MAC address of a LAN port is simply the burned in IEEE MAC address of the NIC (Network Interface Card) that is used to implement the LAN port. The PC may also use Ethernet MAC addressing if a NIC is attached to the PC for forwarding traffic onto a LAN.

System 100 also makes use of multicast Ethernet MAC addresses for carrying multicast IP traffic and the broadcast Ethernet MAC address for carrying broadcast IP traffic. All communication at the NOC 113 (and most of the communication within system 100 in general) is IP based. Every NOC component has (at least) one IP unicast address for each of its LAN ports. These addresses are local to the subnet to which the LAN port is attached.

Specific receivers are assigned an IP Unicast address that may be used for all unicast traffic to and from the transceiver. This address is allocated to the site at auto-commissioning time and is bound to the TCP protocol for the USB adapter on the user equipment. At the same time, a specific gateway is configured with the serial number/IP address mapping for that transceiver. These unicast addresses may be private addresses since the interface to the internet in both directions may be through NOC equipment that can translate to a public IP address.

In addition to its Satellite Card IP unicast addresses, Transceiver 109 uses a private class-A IP address based on the serial number for its CAC individual traffic. IP multicast addresses are used (for efficiency) for all communication on the MUX LAN 421 where there are potentially multiple receivers, including cases where the multiple receivers only exist because of redundancy. There are at least four types of IP multicast addresses used in system 100: (1) the satellite gateway IP multicast address; (2) conditional access IP multicast addresses; (3) the flow control IP multicast address; and (4) User traffic IP Multicast addresses. The first three address types are private to the MUX LAN 421; the fourth address type is public and used for the traffic LAN 423.

The addresses may be selected by the hub operator and configured into the appropriate components. The satellite gateway IP multicast address is used to forward messages to the satellite gateway 413 to be transmitted onto the outroute. All of the senders of traffic (the Gateways, the NCC 411A, the CAC, and the Local Timing Unit) send to this same address. Messages are sent to the satellite gateway 413 in TTR buffers. TTR buffers are UDP/IP multicast packets with a specific format for the UDP data field. satellite gateway handling of TTR buffers, as previously described.

A conditional access IP multicast address may be used by the CAC Server 425 to send conditional access messages to all of the gateways. Two conditional access IP multicast addresses may be used: one for sending key information for unicast traffic, and one for sending key information for multicast traffic. Separate addresses may be defined for this purpose to minimize key handling load on gateways that do not need to process a large number of individual keys.

The flow control IP multicast address is used by the satellite gateway 413 to send flow control messages to all of the Gateways. The NCC 411*a* may be configured with the IP Multicast addresses it is allowed to forward to the traffic LAN. Each gateway may be configured with the set of IP multicast addresses that it may forward to the outroute. If messages appear on the Traffic LAN which match an address in the gateway, the gateway formats the data into TTR buffers and uses the key provided by the CAC server 425 for the multicast address.

System messages are messages generated and used internally by the NOC subsystem. The system messages include conditional access messages, flow control messages; and redundancy messages. All message formats defined by the return channel may be little endian. Existing messages which are reused for the return channel may retain the big or little endian orientation they currently have.

Conditional access messages may be sent by the CAC Server 425 to deliver conditional access information, e.g. keys. There are at least two types of conditional access messages: gateway conditional access messages, and transceiver conditional access messages. Conditional access messages may be unidirectional. That is, messages are only sent from the CAC Server 425, not to the CAC Server 425.

The CAC Server 425 sends encryption keys to the gateways. All of the unicast encryption keys for every enabled serial number are sent to all of the gateways. The gateways may store the received keys in a table. The CAC Server 425 also sends encryption keys to the gateways for multicast service elements. The gateways may store the received keys in a table and use the table to extract multicast encryption keys for forwarding multicast IP packets. The CAC Server 425 sends encryption keys, using the backbone LAN, to the conditional access IP multicast addresses. The rate at which these conditional access messages are sent is controlled by parameters in the CAC Server 425. The messages are sent to support relatively quick notification in the event of a key change and/or the addition of a new transceiver and to support new and restarted Gateways.

The CAC Server 425 sends decryption keys to the transceivers 109. Unicast keys may be sent in Periodic Adapter Conditional Access Update (PACAU) messages, addressed to the specific transceiver's unicast conditional access spacelink MAC address. The PACAUs also may contain multicast keys for the multicast service elements for which the transceiver 109 has been enabled. The mapping of service elements to actual multicast addresses may be sent by the CAC Server 425 in Periodic (Data Feed) Element Broadcast (PEB) messages. These messages may be sent to the broadcast conditional access spacelink MAC address. All of the transceivers 109 receive the PEB messages. The transceiver 109 also supports the reception of the extended PEB format, which allows a virtually unlimited number of IP multicast addresses by providing the capability to segment the PEB.

Flow control messages may be sent by the satellite gateway 413 to the access gateways. The satellite gateway 413 measures the average queue latency in the satellite gateway 413 for each of the priority queues. This information may then be sent to the gateways, mapped to the gateway IDs. The gateways may use this information to increase and decrease the amount of TCP spoofed traffic being accepted and forwarded from IP hosts at the hub. Flow control messages are unidirectional, i.e. they are only sent from the satellite gateway 413 toward the IP gateways.

Outbound multicast user traffic, (e.g. file broadcast or MPEG-2 video), is received by an access gateway. The access gateway may be configured with the list of IP multicast addresses that it should forward and receives encryption keys for these IP multicast addresses from the CAC Server 425. If the gateway receives an IP packet with a multicast address that has not been enabled, the packet is discarded. The IP gateway forwards an IP packet for a multicast address that has been enabled, along with the appropriate spacelink MAC address and encryption key, as a packet payload in a TTR buffer. The satellite gateway 413 may extract the IP packet from the TTR buffer, encrypts it and forwards it to the outroute.

An application on the PC 101 opens an IP multicast when it wants to receive the Outbound Multicast stream. The driver may calculate the appropriate MAC address and configures the IRU 109*a* to receive traffic on the MAC address. The PC driver may forward IP packets based on the multicast address to the applications that have opened the address.

IP Multicast traffic need not be sourced over the return channel. Where inroute bandwidth can be allocated to users, it could be sourced over the return channel by enabling the transceiver 109 to send IP Multicast per the service plan of the transceiver 109. TCP traffic may be spoofed at the NOC 113 to allow for higher speed throughputs even with satellite delay. The Access gateway software may buffer additional traffic for transmission through the satellite and locally acknowledge Internet traffic.

Base upon the user service plan selections, connections may be initiated through the Internet 105 to a specific transceiver 109 by using the IP address associated with the transceiver. If the transceiver 109 is using Network Address Translation (NAT) to the Internet 105, Internet-initiated connections may not be possible since the public Internet address is not associated with a specific private address associated with the transceiver until a connection is initiated from within the NOC 113.

The TCP User traffic, when initiated at the PC 101, may be passed through the system 101 as follows. PC 101 sends an IP Packet to IRU 109a; in turn, the IRU 109a transmits IP packets (possibly in multiple bursts) to the NOC 113. The NCC 411a reassembles and forwards the IP packet to the gateway. The gateway communicates with the destination host and receives the response. The gateway sends the IP packets to the IRU 109a. A NCC 411A may receive return channel packets from the return channels. Each packet may be a subset or a complete IP packet. When the packet is a partial IP packet, the complete IP packet may be reassembled prior to passing the IP packet to an access gateway. First and last bits and a sequence number may be used in each return channel frame to provide the necessary information for the NCC 411a to rebuild the message. The NCC 411a may be able to rebuild packets from many transceivers at once. In addition, multiple data streams may be supported from the same transceiver to support prioritization of traffic.

Within the system 100, packets are formatted using multiprotocol encapsulation. Therefore, all packets include a DVB-standard header that includes a MAC address. For different types of traffic, the MAC address is set differently. The following types of MAC addresses exist: Unicast traffic; Multicast traffic; Unicast conditional access; Multicast conditional access; Return Channel Broadcast messages; and Return Channel Group messages.

Table 1, below, lists exemplary MAC addresses, according to an embodiment of the present invention.

TABLE 1

| Field | Size | Scope | Description |
| --- | --- | --- | --- |
| Serial Number | 24 Bits | Unicast | Serial number burned into the IRU |
| IP Multicast Address | 20 Bits | Multicast | IP Multicast addresses are 32 bit addresses with format a.b.c.d, where octet "a" may be 224–239. |
| Type Indicator | 2 Bits | All | Indicates type of address: 1 - Multicast 2 - Unicast 3 - Internal multicast |

Table 2, below, lists the MAC addresses associated with the various traffic types that are supported by the system 100.

TABLE 2

| Address Type | Value | MAC Address (Hex) |
| --- | --- | --- |
| Unicast User Traffic | Serial Number 1 | 02 00 0A 00 00 01 |
| | Serial Number 2 | 02 00 0A 00 00 02 |
| | Serial Number 256 | 02 00 0A 00 01 00 |
| IP Multicast Traffic | 225.2.3.4 | 01 00 6E 52 03 04 |
| | 239.221.204.1 | 01 00 6E 5D CC 01 |
| Unicast Cond. Access | Serial Number 1 | 02 00 0A 00 00 01 |
| | Serial Number 2 | 02 00 0A 00 00 02 |
| | Serial Number 256 | 02 00 0A 00 01 00 |
| Multicast Cond. Access | Broadcast | 03 00 00 00 00 00 |
| Return Channel Messages | Broadcast | 03 00 00 00 00 01 |
| RC Group Messages | Broadcast - RCE1 | 03 00 01 00 00 01 |
| | Broadcast - RCE2 | 03 00 01 00 00 02 |

A unicast traffic MAC address may be used for traffic that is sent over the outroute to a specific receiver. The MAC address is determined by the serial number of the IRU 109a; the same MAC address is also used for CAC individual traffic. The IP Multicast address is determined from the IP multicast address using the TCP standard. This standard only maps the last two octets of the IP address and part of the second octet of the IP address. Therefore, addresses should be configured to ensure that multiple IP addresses that map to the same MAC address are not used.

The transceiver 109 periodically receives a list of keys for multicast traffic. If the transceiver 109 is enabled to receive the multicast address, then the IRU 109a may enable reception of the appropriate MAC address when an application uses standard Winsock calls to receive from an IP multicast address. Part of enabling the address may be the retrieval of the relevant encryption key and passing that key to the IRU 109a.

The Unicast Conditional Access MAC address is used by the CAC Server 425 to send unicast conditional access messages to a specific transceiver. The address is the same as its unicast traffic MAC. Information about a site's access to different multicast streams and whether it is enabled are periodically transmitted to a site over this address.

The Multicast Conditional Access is used by the CAC Server 425 to broadcast global conditional access information to all transceivers 109. The list of multicast addresses and their keys are periodically provided to all receivers 109. These messages are transmitted unencrypted.

The Return Channel Messages address is used for messages that may be received by all adapters 109 on specific transponders, including those messages required for the commissioning process. Theses messages received on this address are processed directly in the IRU 109a, so the IP header is not used at the receiver and should be ignored. The IP datagram includes the following packet types: a Superframe Numbering Packet (SFNP), which provides a timing reference and identification for the transponder; and an Inroute Group Definition Packet (IFDP), which defines available return channel groups and resources available on each group.

The Return Channel Group Messages address is used for messages sent on a specific return channel group to transceivers 109, which are assigned to the particular group. The grouping is implemented to provide a scalable approach to transmitting information so that a single site does not need to process 300 return channels. The messages received in this address are processed by the IRU 109a, so the IP header is not used by the receiver and should be ignored. The IP datagram may include the following packet types: Bandwidth Allocation Packet (BAP), Inroute Acknowledgement Packet (IAP), and Inroute Command/Ack Packet (ICAP). The BAP contains the bandwidth allocation structure and the allocation of the bursts to each site on the group. The IAP contains a list of the bursts for a specific frame and a bitmask indicating if the frame was successfully received at the NOC 113. The ICAP contains a list of commands to be sent to IRUs 109a from the NCC 411a.

Exemplary packets are sent for local processing in the IRU 109a to support the Return channel. Because these packets can be identified based on the MAC address, they need not be encrypted; consequently, these MAC Addresses can be dynamically added and removed by the IRU 109a. All of these packets that are intended to be processed from the IRU 109a may have UDP/IP headers on them, but these headers may be ignored and assumed to be correct from the IRU 109a; an exception is that since there may be padding on the Outroute for word alignment, the length of these packets may be taken from the UDP Header.

To ensure these messages are processed in the proper order within the IRU 109a, these messages may all be transmitted on the same PID. It should be noted that no assumption is made about the order of messages that are sent from different NCCs 411a, largely because of the possible NOC side network delays.

All the fields in the return channel packets may be encoded using a Big Endian (Network Byte Order) format. Specifically, the structure of the bits for these packets may start with bit 7 of byte 0, and after reaching bit 0 in each byte, they may wrap into bit 7 of the next byte. When a field has bits crossing over the byte boundary, the lower numbered bytes may have the higher place value. For example if a 13 bit field started on bit 2 of byte 7, then the 3 most significant bits (12:10) would come from byte 7 bits 2:0, the 8 next most significant bits (9:2) would come from byte 8, and the 2 least significant bits (1:0) would come from byte 9 bits 7:6.

According to an embodiment of the present invention, the bandwidth associated with these packets is 700 Kbps, of which only 225 Kbps may be processed by a given IRU 109a. This is equivalent to just under 168 MPEG packets per super frame, although the total usable bandwidth may depend on the MPEG Packet packing. This bandwidth may require for each outroute. Although the SFNP may have to be distinct for each outroute, the other packets can be identical for all outroutes that share the common Return channels. All of these frames may be sent with very high priority by the appropriate satellite gateway and the Super Frame Numbering Packets may require the highest priority in the system. Encoding of these packets is especially crucial, as incorrect information, and malformed packets can cause IRU misoperation, including transmitting on incorrect frequencies. These messages may all be UDP datagrams, which may include the following packet types: superframe numbering packet (SFNP), Inroute Group Definition Packet (IGDP), Bandwidth Allocation Packet (BAP), Inroute Acknowledgement Packet (IAP), and Inroute Command/Acknowledgement Packet (ICAP). The structures of these packets are discussed below with respect to FIGS. 6A–6O.

Figure 6E:
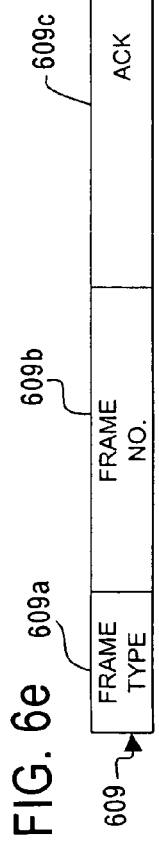
FIGS. 6A–6P are diagrams of the structures of exemplary packets used in the system of FIG. 1.
Figure 6F:
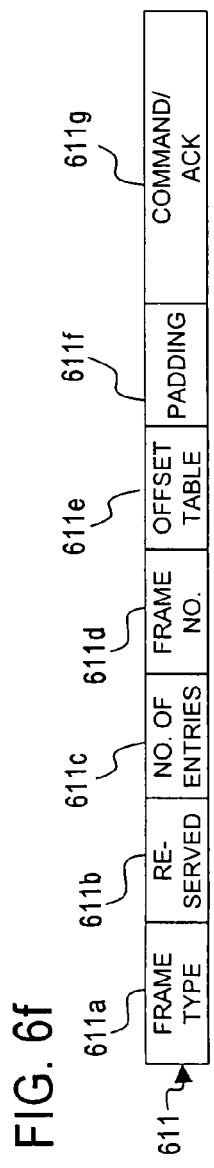
Figure 6G:
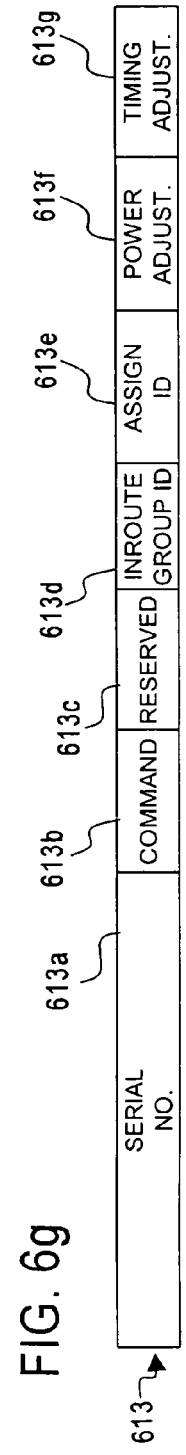
Figure 6H:
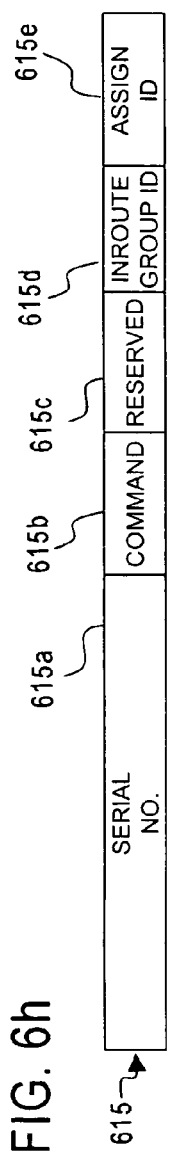
Figure 6M:
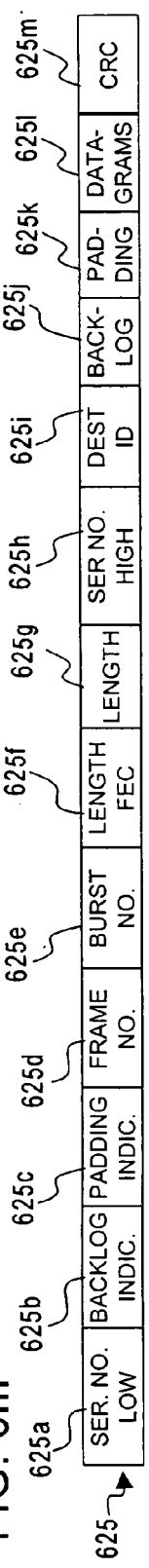
Figure 6N:
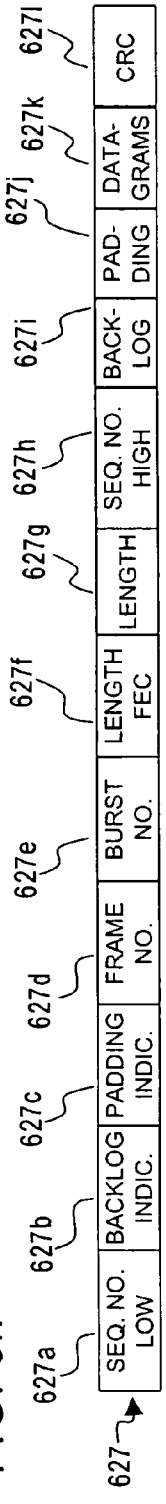
Figure 6O:
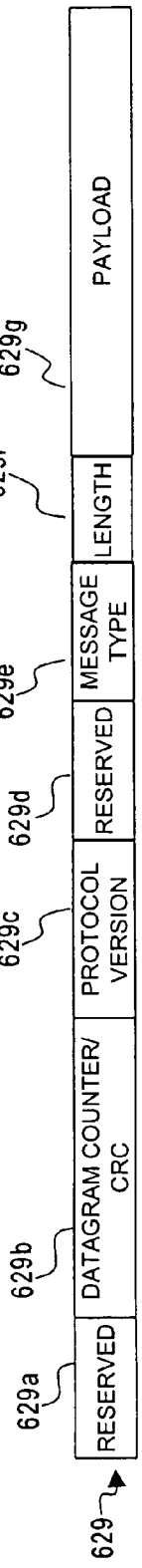

FIGS. 6A–6O are diagrams of the structures of exemplary packets used in the system of FIG. 1. The SFNP packet is used to lock network timing for the return channels and as a beacon to identify the proper network. A super frame numbering packet (SFNP) 601, as seen in FIG. 6A, includes an 8-bit frame type field 601a, which has a value of 1 to specify that the packet 601 is a SFNP. A Timing Source field 601b has a length of 1 bit and is used to distinguish the particular timing unit that generated the SFNP. This field 601b may be used to resolve confusion during switchover between redundant timing references in the NOC 113. A 7-bit Version field 601c is used to indicate the return channel protocol version. If an adapter 109 does not recognize a protocol version as specified in this field 601c, then the adapter 109 does not transmit or use any of the incoming packets that are related to the return channels. According to one embodiment of the present invention, this protocol may only append additional information onto the packet 601, without changes to these existing fields. In this manner, a beacon function for dish pointing can be maintained, irrespective of version.

The SFNP 601 includes a Frame Number field 601d, which is 16 bits in length and is incremented by 8 each super frame, and is used to identify global timing; the Frame Number field 601d may wrap every 49 minutes. A 32-bit Local Delay field 601e captures elapsed time, as obtained from a timing unit, between a previous super frame pulse and the reception of the SFNP through the local equipment. The value of 0 for this field 601e may be used to indicate that the value is unknown for the super frame. The IRU 109a may need to receive 2 consecutive SFNP to be able to interpret this field 601e. Additionally, a 32-bit Echo Delay field 601f indicates the elapsed time between two prior super frame pulses and the reception of the SFNP 601 through the satellite 107. As with the Local Delay field 601e, the value of 0 indicates that the value is unknown for the super frame. The IRU 109a may need to receive three consecutive SFNP 601 to be able to interpret this field 601f. A SFNP Interval field 601g, which is 32 bits in length, specifies the elapsed time between the current super frame pulse and a previous frame pulse. This may allow the IRU 109a to adjust for any differences between the local measurement clock (nominal 8.192 MHz), and the clock used by the timing units, which may be different. The value of 0 may be used to indicate that the value is unknown for the previous super frame. Because of the high accuracy of the timing units, the IRU 109a may only need to receive three consecutive SFNPs 601 to interpret this field 601g. A Space Timing Offset field 601h is a 32 bit field that specifies a timing offset value. A Reserved field 601i, which is 2 bits in length, has a 0 value when transmitted; this field 601i can provide a mechanism to confirm whether the correct satellite network is being monitored. Further, a 15-bit Frequency field 601j specifies the frequency of the outroute satellite transponder, in units of 100 kHz. A Longitude field 601k, which is 15 bits long, indicates the longitude of the Outroute Satellite, in which bit 14 is the West/East_indicator, bits 13:6 are the degrees, and bits 5:0 are the minutes.

The SFNP uses 1 packet per Super Frame, or 2 Kbps of bandwidth, and is transmitted on the beacon multicast address. The processing of these packets are as follows. If the FLL (frequency lock loop) Lock is lost, then no timing can be derived from the SFNP, and network timing is declared as out of Sync. Both timing source may be monitored, if present, but a change in selection may only be made after receiving 3 consecutive SFNP from the same source when no network timing source is selected. In addition, network timing is declared as in Sync, only after receiving 3 consecutive SFNP from the selected timing source, and having the local timing match within a given number of clocks. This may typically require 4 super frame times. Network timing is declared as out of Sync, after receiving 2 consecutive SFNP from the selected timing source, and having the local timing being off by more than a given number of clocks. Additionally, network timing is declared as out of Sync, and the network timing source becomes unselected, after not having received any SFNP for 3 super frame times. Further, network timing is declared as out of Sync, and the network timing source becomes unselected, after not receiving 2 consecutive SFNP for a given number of super frame times. In addition, network timing is declared as out of Sync, and the network timing source becomes unselected, after not receiving 3 consecutive SFNP for a given number of super frame times.

The Inroute Group Definition Packet (IGDP) packet may be used to define the Return channels on a return channel group, and to allow selection of return channel groups for Aloha and Non-allocated ranging. Return channel groups are used to allow for load sharing between a number of return channels, and to minimize the outroute bandwidth required to control the return channel bandwidth allocation. They also may limit the amount of information that needs to be cached or processed by the IRU 109a.

As seen in FIG. 6b, an inroute group definition packet 603 includes the following fields: a Frame Type field 603a, an Inroute Group ID (identification) 603b, a Reserved field 603c, a Return Channel Type field 603d, an Aloha Metric field 603, a Ranging Metric field 603f, and a Frequency Table field 603g. For the inroute group definition packet 603, the 8-bit Frame Type field 603a has a value of 2. The Inroute Group ID field 7 is 7 bits long and identifies a particular inroute group. The 13-bit Reserved field 603c has a 0 value and is ignored during reception. The Return Channel Type field 603d use 4 bits to indicate the type of return channels that are defined in the inroute group; e.g., the value of 0 is defined as 64 Kbps with convolutional encoding. The Aloha Metric field 603 (a 16 bit field) is used for random weighted selection of a return channel group when going active, and is based on the number of Aloha bursts that are defined and the collision rate on those bursts. The metric value also accounts for loading on the NCC 411A, or the Return channel Group. For example, a value of 0 indicates that Aloha is not currently available on this Return channel Group. The Ranging Metric field 603f, which is 16-bits, is used for random weighted selection of a Return channel Group when performing Nonallocated Ranging. The ranging metric value is based on the number of Nonallocated Ranging bursts that are defined and associated collision rate on those bursts. For example, a value of 0 indicates that Nonallocated Ranging is not currently available on this Return channel Group. Lastly, the packet 603 has a variable length (N×24 bits) Frequency Table field 603g, which is used to transmit on each of the return channels in the group. Changing the Frequency for a return channel must be carefully coordinated to avoid interruptions of network operation, or transmission on the wrong return channel frequency around the switch over point. According to one embodiment, there is an upper bound of no more than 4K return channels between all return channel groups for an outroute. The upper bound for the number of return channels in each return channel group depends on the limit of the number of Burst Allocations in the Bandwidth Allocation Packet (FIG. 6c). The value of N is derived from the length of the IP Datagram; this uses 1 packet per Return channel Group per Super Frame, or 26 Kbps of bandwidth for 75 Return channels per Group, and 300 return channels. The packet 603 is transmitted on the all IRU Multicast address.

Each IRU 109a may be expected to monitor all Inroute Group Definition Packets. The IRU 109a filters out Return channel Types that the IRU 109a is not configured to support, and age out the definition if not received for 3 Super Frame times. The table that is created in each IRU 109a from all of these packets should be almost static, with the exception of the Metrics. This is to minimize the overhead in the IRU 109a for reorganizing the Inroute Group Table, and because these changes may disrupt network operation.

When an IRU 109a is active, the IRU 109a may monitor its current Inroute Group, as well as a second Inroute Group around the time the IRU 109a is moved among Inroute Groups. To limit latency when an adapter needs to go active, all inactive adapters with valid Ranging information may use the following procedures. Every 4$^{th}$ frame time in the Super Frame, the IRU 109a may make a random weighted selection between all the Inroute Group's that advertise a non-zero Aloha Metric, and may start to monitor that Inroute Group. The previous Inroute Group may need to be monitored until all previous Bandwidth Allocation Packets have been received, or lost.

For every frame time, the IRU 109a may randomly select one of the Aloha bursts from the Bandwidth Allocation Packet for the Inroute Group that is selected for that frame time. When the IRU 109a goes active and has no outstanding Aloha packets, the IRU 109a may select a random number of frames (from 1 to 8), ignoring any frame times that had no Bandwidth available, it may transmit a single burst during the randomly selected frame time, and wait to be acknowledged. If the IRU 109a has not received an acknowledgement (e.g., the acknowledgement is lost), the IRU 109a may resend the Aloha packet. After a number of retries indicated in the SFNP, the adapter should classify the ITU 109b as non-functional, and wait for user intervention. While the Aloha packet is outstanding, the IRU 109a may monitor up to 3 Inroute Groups: (1) one for the Aloha Acknowledgement, (2) one for the new Inroute Group to try, and (3) one for the previous Inroute Group.

In order to limit latency when an adapter needs to go active, all inactive adapters with invalid Ranging info may use a similar procedure for Nonallocated Ranging bursts. The approach may be augmented to include a default Power Level for the first Nonallocated Ranging burst. Further, this power level may be increased until the Ranging Acknowledgement is received by the IRU 109a.

A bandwidth allocation packet (BAP), shown in FIG. 6C, is used to define the current bandwidth allocation for all inroutes connected to an Inroute Group. The packet 605 includes an 8-bit Frame Type field 605a (which has a value of 3 to indicate a BAP), and a 16-bit Frame Number field 605b, which indicates the Frame Number that is allocated in this packet 605, and may be larger than the current Frame Number. The difference between the frame numbers is a fixed offset to allow the IRU 109a sufficient time to respond to changes in bandwidth allocation. A Burst Allocation field 605c has a length of N×24 bits and specifies all the burst allocations for each Inroute. The field 605c may order all the bursts in a Frame, and may repeat a Frame for each Inroute in the Group; the field 605c is limited to no more than 489 entries, since IP Datagrams are limited to 1500 bytes. This feature enables the IRU 109a to perform a linear search. An incorrect Burst Allocation Table can cause improper operation of the network, as there is limited error checking on this field 605c. The value of N is derived from the length of the IP Datagram FIG. 6c shows an exemplary burst allocation field of the packet 605 in FIG. 6C. The Burst Allocation field 607 includes an Assign ID field 607a, a Ranging field 607b, a Reserved field 607c, and a Burst Size field 609d. The Assign ID field 607a provides a unique identifier that is used to indicate the particular Adapter that has been allocated the bandwidth A value of 0 for the field 607a indicates Aloha (and Nonallocated Ranging) bursts; the value of 0xFFFF may be used to indicate unassigned bandwidth. Other values are dynamically assigned. The NCC 411A may impose other reserved values, or structure on these values, but the Adapter may only know what is explicitly assigned to it and 0. The Ranging field 607b specifies whether the burst is allocated for normal or ranging bursts. Even though an adapter may be designated as ranging, that adapter may be able to send Encapsulated Datagrams over the Inroute; and an active user may have Ranging turned on/off to test or fine tune it's values, with minimal impact on performance. The Reserved field 607c should have a value of 0 upon transmission and ignored on reception. The Burst Size field 607d is in terms of slots and includes the aperture and burst overhead.

For each Frame, the IRU 109a may receive another Bandwidth Allocation Packet from the Inroute Group it is currently expecting to receive bandwidth allocation on. The IRU 109a may need to scan the entire table to obtain the necessary information to transmit data, and process acknowledgements. In an exemplary embodiment, the Burst Allocation field 605*c* may contain the following fields: Inroute Group, Inroute Index, Frame Number, BurstID, Burst Offset, Burst Size, and Acknowledgement Offset. Since the IRU 109*a* can be monitoring two Inroute Groups, the IRU 109*a* may need to confirm the Inroute Group based on the MAC Address of the packet 605, and only process the Bandwidth Allocation Packet 605 for which IRU 109*a* expects to use bandwidth. The Inroute Index is the Cumulative Burst Offset DIV Slot Size of a frame, and is used as an index into the Frequency Table field 603*g* of the Inroute Group Definition Packet 603. Frame Number within the Bandwidth Allocation field 605*c* can come from the Frame Number field 605*b* of the packet 603. A BurstID field may be the 4 least significant bits of the Index into the Burst Allocation field 605*c*. The Cumulative Burst Offset starts at 0, and increases with the each Burst Size. The Burst Offset is effectively the Cumulative Burst Offset MOD Slot Size of a Frame. The Burst Size may come from the Burst Allocation packet (FIG. 6D). An Acknowledgement Offset field is an Index into the Burst Allocation Table of the entry.

This uses 1 packet per Inroute Group per Frame, or 535 Kbps of bandwidth for 25 active users per inroute, 75 Inroutes per Group, and 300 inroutes. Since it is transmitted on the Inroute Group's Multicast address, each IRU may only have to process 134 Kbps.

To ensure that active users do not experience degraded performance or data lost by any load balancing at the NCC 411*a*, at least ten frames prior to moving an IRU 109*a* to a different Inroute Group (but on the same NCC 411*a*), the IRU 109*a* may be notified, so that it can begin to monitor both Inroute Group streams. This feature permits the system 100 to scale. The IRU 109*a* may need to continue monitoring both streams, until all outstanding Inroute Acknowledgement packets are received, or have been identified as lost. There may be at least 1 frame time with no bandwidth allocated between bursts that are allocated on different Inroutes; this ensures that the IRU 109*a* may be able to fill all its assigned slots, and have at least 1 frame time for tuning. The above requirement may apply to bursts that are defined across consecutive Bandwidth Allocation Packets, and when moving between Inroute Groups on the same NCC 411*a*. However, if this requirement is not met, to avoid transmission across multiple frequencies, then transmission may be disabled during one of the assigned frames, rather than permitting tuning during a transmission. There may be at least 1 complete frame with no bandwidth allocated between normal and Ranging bursts, thereby ensuring that the IRU 109*a* may be able to fill all it's assigned slots, and yet have at least 1 frame time for tuning and adjusting transmission parameters. After the Bandwidth Allocation packet (which moves an IRU 109*a* to a different Inroute Group) is sent, the NCC 411*a* may continue to receive bursts under the old Inroute Group for a time in excess of the Round Trip Delay. The NCC 411*a* should be prepared to accept these frames, and to acknowledge them, and the IRU should continue to monitor the Acknowledgements from the old Inroute Group. An IRU 109*a* may not have its bandwidth moved to a different Inroute Group, while the IRU 109*a* is still monitoring a previous Inroute Group the IRU 109*a* has just been moved from—i.e., the IRU 109*a* need only monitor up to 2 Inroute Groups.

An adapter may only be assigned multiple bursts during a single frame time under three conditions. First, if these bursts are all on the same Inroute. Second, the bursts are adjacent to each other (i.e., back to back) in the frame. The adapter may transmit one packet for each allocated burst, but without the Burst Overhead of turning the Radio on and off for each packet. In the third case, all of the bursts, except the last, may be large enough for the maximum sized packet (largest multiple of the slot size ≦256), but only the first burst may have the Burst Overhead/Aperture included in its size. Accordingly, the system 100 is constrained to no more than 6 bursts per frame to support 256 Kbps Inroutes.

Once an AssignID is assigned to an adapter on an Inroute Group, the assignment may not change while the adapter remains active—except as part of a move between Inroute Groups. Once an AssignID is assigned to an adapter on an Inroute Group, it may be left unused for five super frame periods after it is no longer in use.

It is important to note that if an Inroute Group advertises that it has Aloha or Nonallocated Ranging bursts, than it may have some number of those bursts defined every frame time—e.g., for the next ten frame times. Furthermore, the number of bursts should be evenly spread across all frames in the Super Frame. Failure to meet this requirement may result in higher collision rates, and increased user latency.

The IAP packet is used to acknowledge each Inroute packet for assigned bandwidth with a good CRC, regardless of the presence of any encapsulation data. Besides allowing for faster recovery to inroute packet errors, this may also allow measurement of the inroute PER at the IRU. Aloha and Nonallocated Ranging packets are acknowledged explicitly.

FIG. 6*e* shows the structure of an inroute acknowledgement packet, according to an embodiment of the present invention. An inroute acknowledgement packet contains the following fields: a Frame Type field 609*a*, a Frame Number field 609*b*, and an ACK field 609*c*. For this type of packet, the Frame Type field 609*a* is given a value of 4. The Frame Number field 609*b* specifies the Frame that the acknowledgement applies, which may be less than the current Frame Number. The ACK field 609*c* is a bitmap, that matches the entries for this Frame in the Burst Allocation field 605*c* of the Bandwidth Allocation Packet 605. To determine what was acknowledged, the IRU 109*a* may determine which bursts were assigned to it by the Bandwidth Allocation Packet 605, recalling the data that was transmitted during those bursts. The value of N is derived from the length of the IP Datagram, and may match the value of N from the associated Bandwidth Allocation Packet 605.

This uses 1 packet per Inroute Group per Frame, or 57 Kbps of bandwidth for 25 Active Users per Inroute, 75 Inroutes per Group, and 300 inroutes. Since it is transmitted on the Inroute Group's Multicast address, each IRU may only have to process 15 Kbps.

FIG. 6*f* shows the structure of an inroute command/acknowledgement packet, according to an embodiment of the present invention. An inroute command/acknowledgement packet 611 is used to explicitly acknowledge Aloha and Nonallocated Ranging bursts, and to send commands to an Adapter. Acknowledgment packets are sent on the Inroute Group's Multicast address, and commands are sent on the All IRU Multicast address. These packets are multicast to reduce Outroute bandwidth, and since there is no IRU unicast address. The inroute command/acknowledgement packet 611 includes the following fields: a Frame Type field 611*a*, a Reserved field 611*b*, Number of Entries field 611*c*, Frame Number field 611*d*, Offset Table field 611*e*, Padding field 611*f*, and a Command/Acknowledgment field 611*g*. For this type of packet 611, the 8-bit Frame Type field 611*a* is set to a value of 5. A 3-bit Reserved field 611*b* is unused and set to 0 for transmission; the field 611*b* is ignored on reception.

The Number of Entries field 611c, a 5-bit field, specifies the number of entries in the Offset Table field 611e. For Acknowledgments, the 16-bit Frame Number field 611d indicates the frame that is being acknowledged; for Commands, the field 611d specifies the frame that the command is directed towards. The Offset Table field 611e (with N×10 bits) provides a table of offsets for where each of the variable sized Command/Acknowledgment fields 613 begin. The size of the field 611e is known based on the Command field 613, but can also be derived from the Offset for the next Entry, or the size of the IP Datagram for the last entry. Each offset is a 10 bit value, and starts from the beginning of the Offset Table field 611e. The value of N is the Number of Entries. Padding field 611f varies in length from 0 to 6 bits and provides byte alignment at the end of the Offset Table field 611e. A Command/Acknowledgment field 613 has a length of N×8 bits and provides a list of Commands or Acknowledgments, sorted by serial number (SerNr); these commands and acknowledgements are defined according to FIGS. 6G–6L. It should be noted that no more than one Command or Acknowledgment can be sent to an adapter per packet. The value of N is derived from the length of the IP Datagram FIG. 6g shows an Exemplary Ranging Acknowledgement. The acknowledgement 613 includes a Serial Number (Serial No.) field 613a (26 bits), a Command field 613b (4 bits), a Reserved field 613c (3 bits), an Inroute Group ID field 613d (7 bits), an Assign ID field 613e (16 bits), a Power Adjustment field 613f (8 bits), and a Timing Adjustment field 613g (8 bits). The SerNr field 613a specifies the serial number of the IRU 109a. A value of 0 for the Command field 613b indicates a Ranging (and Nonallocated Ranging) Acknowledgment. When an adapter is using allocated Ranging, it may not receive Ranging Acknowledgements for each Frame, but the Encapsulated Datagrams may be acknowledged with the Inroute Acknowledgement Packet 609. The Reserved field 613c is similar to the reserved fields described above. The Inroute Group ID field 613d indicates the Inroute Group for which future Ranging Bursts may be allocated. The Assign ID field 613e is used for future Bandwidth Allocation Packets 637, whereby future Ranging Bursts may be allocated. If the Assign ID field 613e has a value of 0, Ranging may be terminated, thereby leaving the adapter inactive. Ranging can also be terminated by the clearing of the Ranging bit in the Burst Allocation field 605c, but this should only be done if the Ranging had passed. The Power Adjustment field 613f is a signed 8 bit field that specifies power adjustment in increments of 0.1 dB. The Timing Adjustment field 613g indicates timing adjustments in units of µs.

FIG. 6h shows the structure of an exemplary Aloha Acknowledgement. This acknowledgement 615 includes a Serial Number field 615a, a Command field 615b, a Reserved field 615c, an Inroute Group ID field 615d, and an Assign ID field 615e. These fields 615, 615a, 615b, 615c, and 615e are similar to the fields 613a, 613b, 613c, 613d, and 613e, respectively, the ranging acknowledgement 613. With this particular acknowledgement, the Command field 615b is given a value of 1. The Inroute Group ID field 615d specifies the inroute group that is to receive future bandwidth allocations. The Assign ID field 615e is an Id used in future Bandwidth Allocation Packets 637, whereby future Bursts may be allocated. A value of 0 for the Assign ID field 615e acknowledges the data without assigning any bandwidth. If any Backlog is advertised from the Aloha packet, the packets may need to be flushed, since the adapter remains inactive and no synchronization is possible.

FIG. 6i shows the structure of a Disable ITU command, according to an embodiment of the present invention. A Disable ITU command 617 a Serial Number field 617a (26 bits), a Command field 617b (4 bits), and a Reserved field 617c (3 bits). As with the acknowledgement packets 613 and 615, the Serial No. field 617a stores the serial number of the IRU 109a. For this type of command, the Command field 617b is assigned a value of 2. Under this command, the IRU 109a may not transmit until it receives another command indicating that the IRU 109a may transmit. This setting, for example, is stored in nonvolatile memory on the IRU 109a.

FIG. 6j shows the structure of an Exemplary Start Ranging Command. This command 619 includes a Serial Number field 619a (26 bits), a Command field 619b (4 bits), an Invalidate field 619c (1 bit), a Reserved field 619d (3 bits), an Inroute Group ID field 619e (7 bits), and an Assign ID field 619f (16 bits). In this case, the Command field 619b has a value of 3. If the adapter is inactive, this command 619 may start sending an Nonallocated Ranging packet. An active adapter may be informed by having Ranging bursts allocated. The 1-bit Invalidate field 619c, if set, indicates that the Adapter may invalidate it's prior Ranging Info, and revert to the defaults, before sending it's Nonallocated Ranging packet. The Reserved field 619d, Inroute Group ID field 619e, and Assign ID field 619f are similar to the fields 615c, 615d, and 615e, respectively of acknowledge packet 615.

FIG. 6k shows the structure of a Go Active Command and a Change Inroute Group Command. These commands include the following fields: a Serial Number field 621a (26 bits), a Command field 621b (4 bits), a Reserved field 621d (3 bits), an Inroute Group ID field 621e (7 bits), and an Assign ID field 621f (16 bits). For the Go Active Command, the Command field 621b has a value of 4, while the field 621b is set to a value of 5 for the Change Inroute Group command. In both commands, the Assign ID field 621e is used in future Bandwidth Allocation Packets, whereby future Bursts may be allocated. With respect to the Go Active Command, if the Assign ID field 621f has a value of 0, the data is acknowledged without assigning any bandwidth. If there is any Backlog advertised from the Aloha packet, the backlog of packets may need to be flushed, since the adapter remains inactive and no synchronization is possible. In the case of a Change Inroute Group command, an Assign ID field 621e with a 0 value can be used to make an adapter inactive (alternatively, the bandwidth allocation of the adapter is removed).

The structure of a Send Test Pattern Command is shown in FIG. 6l. This command 623 includes a Serial Number field 623a (26 bits), a Command field 623c (4 bits), a Reserved field 623d (3 bits), a Pattern field 623d (3 bits), and a Frequency field 623e (24 bits). With this command, the Command field 623c has a value of 6. It is noted that this command may inactivate the adapter. The 3-bit Pattern field 623d specifies the test patterns that can be programmed from the ITU registers. If the Pattern field 623d has a value of 0, then the test is terminated. The test can also be terminated if the Send Test Pattern Command is not repeated within four frame times.

The return channel burst structure may be defined by the burst structure required by the Burst Channel Demodulators (BCDs) 411b. The 64 kbps OQPSK BCD 411b utilizes the frame structure, shown below in Table 3. The frame overhead is sized as 2 slots (112 bits) minus the aperture size.

The Aperture size (125 microseconds) is 8 bits.

TABLE 3

| Field | Bits | Micro-sec. | Comments |
|---|---|---|---|
| Radio Turn-on | 2 | 31 | |
| Continuous Wave | 55 | 859 | Divided into subparts |
| CW Detect | 17 | | Needed for BCD to determine start of burst |
| Freq Est | 24 | | Needed for BCD frequency offset estimation algorithm |
| Freq Proc | 3.5 | | Time for BCD to process frequency estimation |
| HW Update | 10.5 | | Time to prepare DSPs and other components for data |
| Unique Word | 24 | 375 | Unique word needed for burst acquisition |
| Dead Time | 3 | 47 | All 1's |
| PAYLOAD | 56*N | 875*N | Each slot is 7 bytes of user traffic |
| Postamble | 18 | 281 | Parity bits at the end of the burst |
| Radio Turnoff | 2 | 31 | |
| TOTAL Overhead | 104 | | 2 slots - Aperture (8 bits) |

All the fields in the Inroute packets, and Inroute related packets, may be encoded using a Big Endian (Network Byte Order) format. To be more specific, the bits in any structure defined for these packets may start with bit 7 of byte 0, and after reaching bit 0 in each byte, they may wrap into bit 7 of the next byte. When a field has bits crossing over the byte boundary, the lower numbered bytes may have the higher place value. For example if an 13 bit field started on bit 2 of byte 7, then the 3 most significant bits (12:10) would come from byte 7 bits 2:0, the 8 next most significant bits (9:2) would come from byte 8, and the 2 least significant bits (1:0) would come from byte 9 bits 7:6.

As shown in FIG. 6*m*, the inroute packet format includes of a variable size header and 0 or more bytes of encapsulated datagrams. The encapsulated datagrams are sent as a continuous byte stream of concatenated datagrams, with no relationship to inroute packetization. Proper interpretation may require a reliable, ordered processing of all data bytes exactly once. To resolve problems due to data loss on the inroute, a selective acknowledgement, sliding window protocol may be used. As is the case for such sliding window protocols, the sequence number space may be at least twice the window size, and data outside the window may be dropped by the receiver.

Since the burst allocations may be of different sizes, and can vary over time, the windowing may be of a byte level granularity. For the same reasons, retransmissions may be less efficient, as the retransmission burst may not match the original transmission burst size.

For allocated streams, Inroute burst data may be retransmitted if not acknowledged in the Inroute Acknowledgement Packet for that Frame Number, or if that Acknowledgement is lost. After, for example, 3 retries, the adapter should classify the ITU as non functional and wait for user intervention.

If synchronization problems are discovered, the NCC 411*a* can force the adapter inactive by removing its bandwidth allocation. This may cause the adapter to reset its sequence number and datagram counter to 0, and start at the beginning of a new datagram. This may also cause the flushing of all Backlogged datagrams in the IRU. Since the sequence number is reset every time the adapter goes active, any data sent in Aloha or Nonallocated Ranging bursts may be duplicated due to retransmissions, if the acknowledgement is lost.

One of the "features" of the BCDs 411*b* is that multiple packets can be concatenated in a Burst, but if Bits 7:3 of Byte 0 are all 0's, and Bits 7:0 of Byte 1 are all 0's, then the BCD 411*b* may ignore the rest of the burst. To take advantage of this, when back to back bursts are allocated to the same adapter, it may not turn off the Radio, and may use the saved Burst Overhead for extra Payload. This may keep the required 1 to 1 mapping of allocated bursts to packets. Also, if the requirement of avoid 0's at the beginning of the packet is not met, the Backlog Indicator can be.

Active adapters that have no data ready to send may send Inroute packets of the full allocated burst size without any encapsulated datagrams to maintain channel utilization, and allow measurement of inroute PER from the NCC 411A. This may be replaced to include periodic Network Management packets containing system profiling information.

A burst data frame (i.e., inroute packet) for Aloha (and ranging) bursts has the structure shown in FIG. 6*m*. The NCC 411A can detect the type of burst from the frame numbering information in the packet header. The structure for the inroute packet include the following fields: a Serial Number Low field 625*a*, a Backlog Indicator field 625*b*, Padding Indicator field 625*c*, Frame Number field 625*d*, Burst Number field 625*e*, a Length FEC field 625*f*, a Length field 625*g*, a Serial Number High field 625*h*, a Destination ID field 625*i*, a Backlog field 625*j*, a Padding field 625*k*, an Encapsulated Datagrams field 625*l*, and a CRC field 625*m* The Serial Number Low field 625*a* stores the 8 least significant bits of the serial number. The serial number is split because of the BCD requirements with respect to the location of the Length field 625*g* and because of the need to have the first 13 bits non-zero. The 1-bit Backlog Indicator field 625*b* indicates the presence of the Backlog field. This should always be present for Aloha and Nonallocated Ranging bursts. The 1-bit Padding Indicator field 625*c* indicates the absence of the Padding field. This field should be encoded as a 0 to indicate padding is present. The reason that this is encoded this way, is so that the BCD requirement for having 1 of 13 specific bits set can be met. If they are not set, then the packet is already padded, and one byte of padding can be traded for enabling the Backlog.

The Frame Number field 625*d* stores the 2 least significant bits of the frame number, and may help the NCC 411A to determine which burst was received. The 4-bit Burst Number field 625*e* indicates the burst slot that the Frame was transmitted in, assisting with identifying that burst as an Aloha type burst. The 8-bit Length FEC field 625*f* is the FEC value for the length, produced via table lookup in software. The 8-bit Length field 625*g* is the length of the burst and includes all the bytes starting with the Backlog Indicator field 625*b* through the CRC field 625*m*. The 8-bit Serial Number High field 625*h* stores the 8 most significant bits of the of the Source adapter's serial number. The Destination ID field 625I specifies the destination hybrid gateway. The Backlog field 625*j* indicate the number of bytes of Backlog that are present. It's encoded as a floating point number with a 2 bit exponent field and a 6 bit mantissa, and may be rounded up by the IRU. The end of the Backlog is indicated by $8^{Backlog[7:6]} \times Backlog[5:0] \times 2 + SeqNr + size$ of the Encapsulated Datagram field. As such, it may include out of order, acknowledged data. It is only included to indicate increases in the size of the backlog, as measured from the IRU. The size of this field is sufficient for just under 2 seconds at 256 Kbps. The Padding field 625*k*, if present, has its first byte indicating the total number of Padding bytes (N); all the other bytes are "Don't Care". This field 625*k* is used to allow for stuffing packets to maintain link utilization when no data needs to be transferred, and to allow the padding of packets to the minimum burst size for Turbo codes. The N×8-bit Encapsulated Datagrams field 625*l* contains 0 or more bytes of encapsulated datagrams. There is no relationship between IP Datagram boundaries and the contents of this field; i.e., this field 625*l* can contain a section of an IP Datagrams, or multiple IP Datagrams. The value of N can be derived by subtracting the size of the other fields in the packet from the Length The CRC field 625*m* stores a 16-bit CRC; a burst with an invalid CRC is dropped and statistics retained.

As shown in FIG. 6*n*, the structure of another inroute packet include the following fields: a Sequence Number Low field 627*a*, a Backlog Indicator field 627*b*, Padding Indicator field 627*c*, Frame Number field 627*d*, Burst Number field 627*e*, a Length FEC field 627*f*, a Length field 627*g*, a Sequence Number High field 627*h*, a Backlog field 627*i*, a Padding field 627*j*, an Encapsulated Datagrams field 627*k*, and a CRC field 627*l*. The Sequence Number Low field 627*a* stores the 8 least significant bits of the Sequence, and thus, is 8 bits in length. The sequence number is split off because of a BCD requirement for the placement of the Length fields 627*f* and 627*g* as well as the need to avoid all 0's in certain bit positions. The 1-bit Backlog Indicator field 627*b* indicates the presence of the Backlog field. This should always be present for Aloha and Nonallocated Ranging bursts. The 1-bit Padding Indicator field 627*c* indicates the absence of the Padding field 627*j*. This field 627*j* should be encoded as a 0 to indicate padding is present. The reason that this is encoded this way, is so that the BCD requirement for having 1 of 13 specific bits set can be met. If they are not set, then the packet is already padded, and one byte of padding can be traded for enabling the Backlog.

The Frame Number field 627*d* stores the 2 least significant bits of the frame number, and may help the NCC 411A to determine which burst was received. The 4-bit Burst Number field 627*e* indicates the burst slot that the Frame was transmitted in. With the addition of the Inroute and Frame number it was received on, the NCC 411A may be able to uniquely identify the source (SerNr) and destination (DestId). The 8-bit Length FEC field 627*f* is the FEC value for the length, produced via table lookup in software. The 8-bit Length field 627*g* is the length of the burst and includes all the bytes starting with the Backlog Indicator field 627*b* through the CRC field 627*i* m The 8-bit Sequence Number High field 627*h* stores the 8 most significant bits of the sequence number field that is used for the retransmission protocol. This is the Selective Acknowledgement, sliding window, byte address of the first byte of the Encapsulated Datagrams field. With a 32 Kbyte window size, this is large enough for 1 second at 256 Kbps. The Backlog field 627*j*, Padding field 627*j*, Encapsulated Datagrams field 627*k*, and CRC field 627*m* are similar to the fields 625*j*, 625*k*, 625*l*, and 625*m* of packet 625.

Some of the packets sent to the NCC 411*a* do not require an IP header. Therefore, bandwidth savings are made by sending much smaller datagram headers, as shown in FIG. 6O. The packet 629 includes a 4-bit Reserved field 629*a*, which should have a value of 0 during transmission and may be used to specify Encryption, Compression, or Priority values. A Datagram Counter/CRC field 629*b* (12-bits) stores a 12 bit Datagram Counter value, from which a 12 bit CRC can be calculated by software on this Encapsulated Datagram appended with the SerNr and DestId; and the result is stored in this field 629*b* over the Datagram Counter value. The purpose of this field 629*b* is to detect loss of Synchronization between the IRU 109*a* and the NCC 411*a*, thereby ensuring uncorrupted reassembly, correct source and destination addresses, and no loss of datagrams. Failures on this CRC should be considered as a synchronization failure, and the IRU 109*a* should be forced to the inactive state by the NCC 411*a*, so as to initiate resynchronization. The polynomial to use in calculating this CRC is $X^{12}+X^{11}+X^3+X^2+X+1$ (0xF01), and the preset (initial) value is 0xFFF. The packet 629 also includes a 4-bit Protocol Version field 629*c*; this field 629*c* may/be encoded as 0 to indicate Network Management datagrams. Further, this value may be explicitly prohibited from being sent from the Host driver, for Network Security reasons. Further the packet 629 contains an 8-bit Message Type field 629*e* for specifying the message type, a 16-bit Length field 629*f* for indicating the length of the datagram (including the header), and a Payload field 629*g*, which is a variable length field (N×8 bits). The value of N is the Length field that is present for all Payload formats.

Figure 6P:
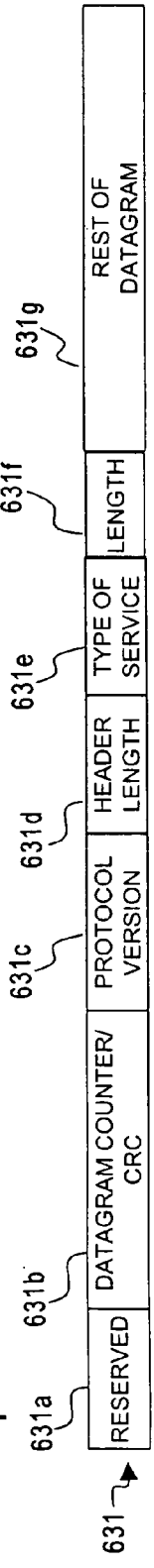

FIG. 6*p* shows the inroute payload format for IP datagrams. The datagram 631 includes a Reserved field 631*a*, a Datagram Counter/CRC field 631*b*, and a Protocol Version field 631*c*, which are similar to that of the datagram of FIG. 6O. In addition, the datagram 631 contains a Header Length field 631*d* (4 bits) for storing the IP header length, a Type of Service field 631*e* (8 bits) for specifying the type of service, a Length field 631*f* (16 bits) for storing the length of the entire datagram including the header, and a Rest of Datagram field 631*g* (N×8 bits). Details of the rest of the IP frame are described in IETF (Internet Engineering Task Force) RFC 791, which is incorporated herein by reference. The value of N is derived from the Length field. It should be noted that the prior header includes the first four bytes of the IP header.

A number of scenarios exist in which the NCC 411*a* may force an adapter to the inactive state. For example, if the NCC 411*a* detects a synchronization error with the adapter, arising from errors in the encapsulation layer of the protocol, or by the Protocol Version field 629*c* and Length field 629*f* of the payload 629*g*. In addition, if the NCC 411*a* receives no inroute packets with good CRC from the adapter for 24 frame times, then the adapter becomes inactive. Also, if the NCC 411*a* receives no Inroute packets with good CRC containing encapsulated datagrams for a number of frame times configured at the NCC 411*a*. Prior to that, the adapter may have its bandwidth allocation reduced due to inactivity. Inactivity may forced upon the adapter if the NCC 411*a* receives Inroute packets with good CRC containing encapsulated datagrams that have already been acknowledged (out of window or completely overlapping prior data) after a configured number of frame times from when it last advancing the SeqNr. This can be due to excessive retransmissions, or synchronization errors. Lastly, the adapter can be made inactive through an operator command.

An IRU 109*a* may become inactive if the IRU 109*a* does not receive any Bandwidth Allocation packets from its current Inroute Group, which has assigned the IRU 109*a* bandwidth for 24 frame times. If the Bandwidth allocation packet is not received, the IRU 109*a* may not transmit during that Frame, but may consider itself as remaining active. Reception of explicit commands from the NOC 113 may also change the state of the IRU 109*a* from active to inactive. Further, a USB Reset or a USB Suspend may cause the adapter to go inactive, and flush the adapter's Backlog. The adapter may go active again, based on received messages from the NOC 113. Further, the IRU 109*a* may become inactive if the adapter's transmit path is disabled because of various conditions, for example, loss of FLL lock, loss of Super Frame synchronization, and etc.

Each of the gateways to be supported by the NCC 411a is configured into the NCC 411a. For each gateway ID, the NCC 411a has the gateway address to gateway IP address mapping. This mapping may be periodically sent to all of the receivers. The receiver uses the mapping transmission to determine which gateway id is associated with its gateway IP address and informs the IRU 109a which gateway ID to use for inbound messages when it first becomes active using an ALOHA burst. This may support modes where the gateway IP address is dynamically set at connection setup time.

The source address may be the lower 28 bits of the 32 bit transceiver serial number. This is used for packet rebuilding. Messages may be sent by serial number to a receiver for polling, bandwidth allocation, and retransmission support.

The network timing is designed to control the burst timing of a group of return channels, which share the same frame timing. The frame timing is derived from a pulse from the NCC 411A. The NCC 411A allocates bandwidth, coordinates the aperture configuration, and sends framing pulses to both the BCDs that receive the traffic and to timing units which measure packet delay.

The NOC 113 may provide return channel frame format information once every 8 TDMA frames. The TDMA frame time is 45 milliseconds. Therefore, the return channel "super frame" may be defined as 360 milliseconds. To properly coordinate the return channel frame timing, additional information is provided to the receiver so that the receiver may precisely time its burst transmission time as an offset of the received "super frame".

Accordingly, the NCC 411a sends a super frame marker pulse once every 360 ms to the timing units 409, and concurrently transmits a super frame IP frame (super frame header) to all IRUs 109a. A frame pulse is sent to the BCDs 411b every 45 milliseconds. The delay between the super frame marker pulse and the associated frame pulse is a fixed time, which is denoted as the "space timing offset". The space timing offset is calculated as the maximum round-trip time from the farthest receiver plus two frame times. The two frame times are provided as a buffer to ensure that the transceiver has sufficient time to process return channel frame format data and to forward the return channel data to the transmit indoor unit one-half frame time ahead of the frame transmit time. The super frame header is used by every transceiver 109 to synchronize the start of frame marker to the NCC 411a super frame marker. However, this information is not sufficient because there is a delay from the time that the NCC 411a generates the super frame header until the header is received by the receiver.

The super frame header delay encompasses the NOC delay, the transmission time to the satellite (from the NOC 113), and the transmission time from the satellite to the specific receiver. The transmission time from the satellite to the specific receiver is a known parameter that is determined during ranging. This value can vary slightly due to satellite drift along the vertical axis. To adjust for this variation, Echo Timing is implemented at the NOC to measure changes in the satellite position. Echo Timing measures both the transmission time from the NOC 113 to the satellite 107 and the satellite drift from the NOC's position (which approximates the drift from the receiver's position). The transceiver 109 is unaware of the delay in the NOC 113, which can vary in real-time. Thus, a second IRU 409d is implemented in the NOC 113 to measure the NOC delay. A pulse is sent to this IRU 409d when the frame is supposed to be sent, and the IRU 409d detects when the frame was actually sent. This delay is broadcast in the Frame Time message to all return channels to adjust for the NOC delay when calculating the actual time of the start of the super frame.

When the transceiver 109 receives a super frame packet, the transceiver 109 time-stamps the packet. This time-stamp is created, for example, using an internal 32-bit counter free-running at 32.768/4 MHz. For the transceivers 109 to determine exactly when the super frame marker occurred at the outroute hub, software of the user terminal 101 subtracts the site's satellite delay and the NOC delay. The NOC delay is broadcast in the Frame Numbering Packet. This delay is calculated at the HUB by the Local Timing IRU. The NOC 113 also provides the NOC 113 to satellite portion of the satellite delay in this message as the difference between the local timing and echo timing IRUs 409. The Receiver has a configured value for the satellite to receiver satellite delay; other than ranging, this is a fixed value. In this situation, the NOC delay at ranging is stored and the change in the NOC delay is also applied to the receiver satellite delay to approximate satellite drift. When ranging, the PC approximates this value from the location of the satellite, location of the receiver, NOC timing, and the space timing offset configured in the NOC. The ranging process adjusts this value, and the site stores the final value.

Once the super frame timing has been generated, the site may determine its transmission time such that the frame is received at the proper time at the NOC 113. The time at which the site may transmit is a satellite hop prior to the time that the NOC 113 expects the data to be received. The transmission time is measured by starting with the fixed space timing offset later than the regenerated super frame time. The NOC delay and the receiver satellite delay may be subtracted from this timebase. The final adjustment, for satellite drift, is made by determining the NOC delay difference between current and ranging and applying it.

The "ranging" process, whereby a site on a NCC 411a is configured is described as follows. When the IRU 109a is configured, the host PC 101 provides parameters including a "range timing offset" for the receiver. At this point in time, the IRU 109a may not enable transmission if the ranging timing is zero. The IRU 109a, however, may enable the MAC for the NCC 411a master list and receive this message locally. Thereafter, when IRU 109a acquires transmit timing and is requested by the PC host 101 to range, IRU 109a may select a NCC 411a based on having an available ranging burst. IRU 109a requests a ranging transmission by sending a message over the ranging burst using some default amount of power after some random number of frame backoffs. If no response is received and the burst is still available, IRU 109a may increase power and try again. If the burst is now allocated to a different user, IRU 109a may revert to selecting a NCC 411a based on available ranging bursts. Once ranging response is received, IRU 109a may start sending ranging data every frame; this data may include the frame number. Next, IRU 109a adjusts ranging time and power based on NOC response and continues to adjust until IRU 109a is within a close tolerance. IRU 109a then stores the values when ranging is successful. IRU 109a then enables normal transmission mode The NCC 411a may be capable of requesting a site to enter ranging mode. When the site does enter this mode, the site may use the ranging burst it has been assigned. It may transmit normal traffic (or a small fill-type packet) to the NCC 411a. The NCC 411a may adjust the timing and power for the site. These adjustments may be stored if the NCC 411a indicates a successful re-range of the site.

According the one embodiment of the present invention, the Return Channel requirements are largely based on a traffic model, which defines the traffic pattern for a typical user. The capacity requirements, for example, may be as follows. It is assumed that the system 100 is based on a 2-to-1 ratio of outroute transponders to return channel transponders. An exemplary requirement is approximately 22,000 users per transponder, so 45,000 users (4500 active) per transponder are required for the return channel. Given a 2-to-1 ratio, 300 64 kbps return channels per transponder are supported by system 100, with 15 active users per return channel. Each NCC 411*a* supports up to 30 return channels (32 BCDs, in which 2 are backups). Since each return channel supports 15 active users, the bandwidth sizing may assume 450 active users for a NCC 411*a*. The return channels may be scaled in sets of 30 return channels.

In the alternative, the system 100 may support a 5-to-1 ratio of outroute transponders to return channel transponders. In this case, the system 100 provides up to 600 64 kbps return channels per transponder, with 25 active users per return channel The return channels on an NCC 411*a*, according to an embodiment of the present invention, may support frequency hopping to provide increased efficiency of system 100. A subset of return channels may be configured to support a contention protocol, such as Aloha. It should be noted that any equivalent contention protocol may be utilized in system 100. A receiver may randomly select a return channel with Aloha slots. In turn, the NOC 113 may assign the receiver a stream on the same or a different return channel. The NOC 113 may change the frequency for the assigned stream when the site requires additional bandwidth, when another site requires additional bandwidth on the same return channel, or when the site may be used for a poll response on another return channel to keep the BCD 411*b* locked for the return channel. NCC polling is used to keep BCDs 411*b* locked. The NCC polling algorithm also ensures that bandwidth is not wasted polling sites that are known to be either good or bad. The NCC polling algorithm may poll sites based on a LRU used list. Both the least recently used and "known bad" list may be rolled through to periodically verify site health of all sites. When the NCC 411*a* changes the frequency for a site, the NCC 411*a* may, at a minimum, provide a single frame for the site to retune to the new frequency.

A user on the system may have bandwidth allocated in one of the following three states. In the first state, if the user has not transmitted traffic for a period of time, then the user may be inactive. When inactive, the user may use Aloha to send initial traffic to the NOC 113. The second state is when the user is active. In this state, a periodic stream is setup for the user. The periodic stream, at 1 kbps, is sufficient to handle TCP acknowledgements assuming ack reduction timer of 400 milliseconds. In the third state, the user's transmit backlog exceeds a predetermined value, in which additional bandwidth is provided. Additional bandwidth allocations are supplied until the maximum is attained or the backlog begins to decrease.

A pure-Aloha system assumes that a packet is randomly transmitted in a slot when data transmission is requested. The standard efficiency of a pure-Aloha system is 7%; this means that, when over 7% of the system is loaded, there may be a high number of retransmits necessary, making the response time delays too long. With a 7% efficiency rate, each active user would get (64 kbps/return channel)*(1 return channel/15 users)*(0.07)=300 bits/sec. This is obviously not enough bandwidth. In addition, aloha return channels may have more difficulty applying future efficiency techniques because of the collision nature of the channel.

A diversity aloha system is an adjustment to the pure-aloha system in that every packet to be sent is actually sent 3 times. This channel becomes 14% efficient. This doubles the throughput to 601 bits/sec.

An Aloha/Periodic stream technique is based upon the idea of being able to forecast the type of traffic an active user may be transmitting over the return channel. For the forecasted traffic (which occurs a majority of the time), the user may have non-collision bandwidth available. When the traffic requirements exceed the forecasted level, the user may be provided with additional allocated bandwidth An Aloha/Periodic Stream-PLUS technique builds upon the above Aloha-based concepts. Some of the capabilities that are provided in addition to the periodic stream are as follows: load balancing and minimal delay. The traffic is balanced to ensure that non-busy user (those not requiring additional bandwidth) are equally loaded on all return channels that support the streams. Also, a minimal delay algorithm, which is more fully described below, is employed to ensure that user traffic can be transmitted to the NOC 113 expediently.

The minimal delay approach relies on equally dividing all bandwidth, other than that used for users requiring additional bandwidth, among all other active users. A minimum (4 kbps or so) may be ensured for each user so other users may be unable to request additional bandwidth if every site does not have the minimum amount of bandwidth. This approach provides optimal results when the return channels are lightly loaded. As users become active, they are assigned to the return channels with the fewest number of users which leads to automatic load balancing.

In addition, some minimal burst size is defined for the per-user burst. This size results in a maximum number (denoted as M) of bursts per frame (which may be 3 (120 byte)–5 (71 bytes)) depending of frame analysis. On a given return channel, it is assumed that there are 357 burst bytes per frame time, which may be at least two bursts of traffic. As users are assigned to the return channel, they are provided bandwidth according to Table 4, below.

TABLE 4

| No. of Users | Burst/frame | Approximate Rate |
| --- | --- | --- |
| 1 user | Two bursts/frame | 90% |
| 2 users | One burst/frame | 45% |
| 3 – M users | One burst/frame | $[0.90/(3 - M)] \times 100\%$ |
| M + 1 – 2M users | One burst/frame | $[0.90/(M + 1 - 2M)] \times 100\%$ |
| 2M + 1 – 4M users | One burst/frame | $[0.90/(2M + 1 - 4M)] \times 100\%$ |

If M is defined as 5, then up to 20 users may be supported with each user getting 2.5 kbps. If M is defined as 4, then the number of users supported per return channel is 16 which is above the required value.

The bandwidth allocation is based on pre-defining the size of the "periodic" burst. According to one embodiment of the present invention, it is assumed that three equally-sized bursts may be used. Since the 64 kbps frame has 57 7-byte slots, each burst may have a size of 19×7=133 bytes.

The algorithm also assumes a small number of return channels which are full of slotted Aloha slots. These slots may be sized to handle the normal first transmission from a user (which is either a DNS lookup or an actual request). The Aloha burst sizes may be also 98 bytes (14 slots) to support 4/frame. Fine tuning may be required using an ERLANG analysis on the arrival rate of packets from receivers in an inactive state.

When an Aloha burst is received, the user is assigned periodic bandwidth The bandwidth is given an inactivity timeout value in seconds. In particular, if no data are yet received for the user, the algorithm uses the configured long timeout. If past data indicates periodic individual packets, the configured short timeout is used; otherwise, the long timeout is employed.

When a receive packet indicates that the backlog is greater than a configured amount, additional bandwidth may be provided to ensure that the data can be transmitted within a configured amount of time, if sufficient bandwidth exists. This may require switching the user to another return channel.

The bandwidth allocation algorithm ensures, when possible, that only the periodic bandwidth users are moved to another frequency. This allows the high-throughput users to transmit with no single frames of downtime (which are required if the site must switch frequencies). When possible, the bandwidth is allocated to ensure that user traffic backlog is reduced within a certain number of frames. The total backlog above the amount needed for additional bandwidth is determined. The algorithm determines if the requested bandwidth can be met within the number of frames. If so, the bandwidth is allocated as needed; if not, then the algorithm starts by limiting the bandwidth for those users with the largest backlog, as more fully described below.

Figure 7:
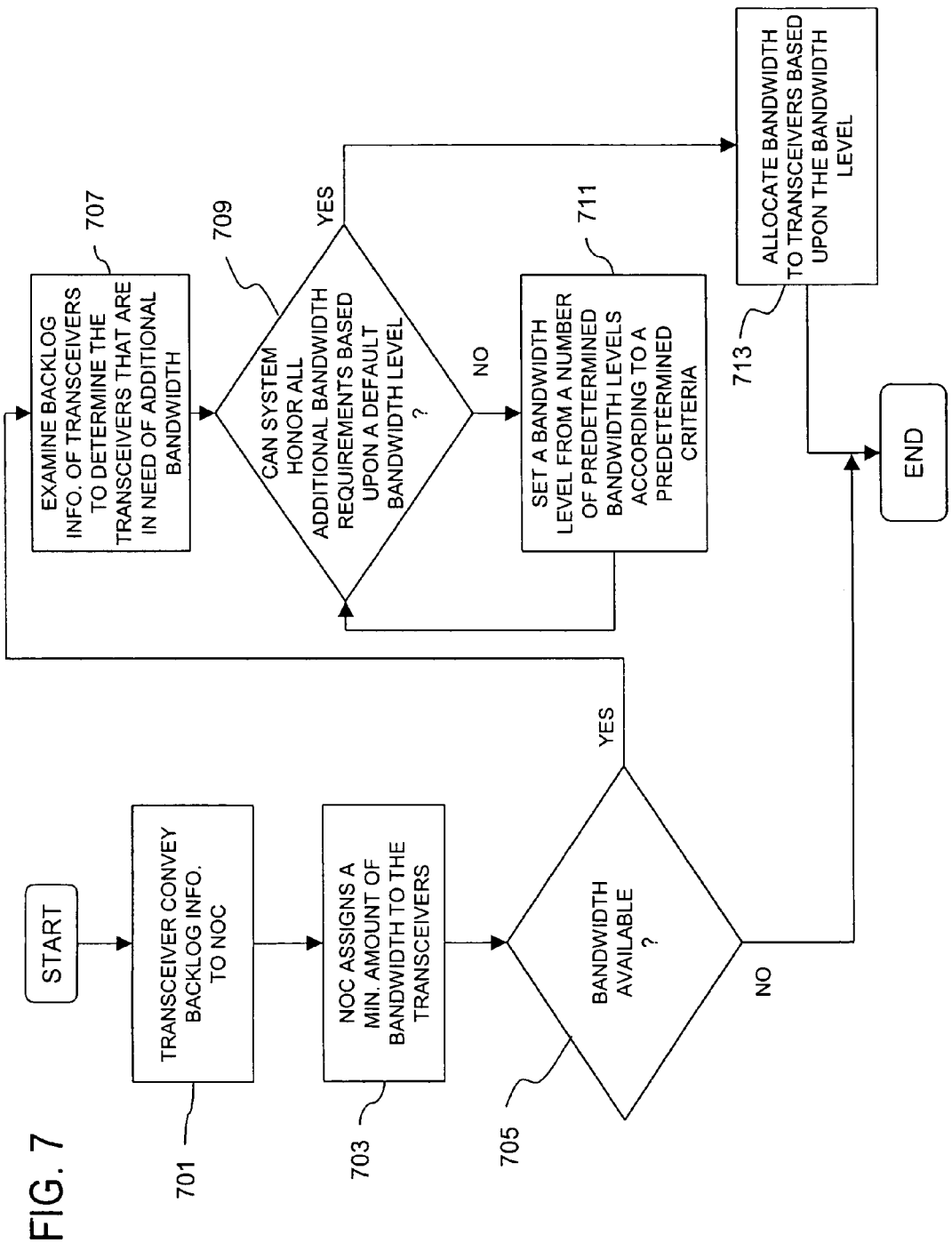
FIG. 7 is a flow chart of the return channel bandwidth limiting process utilized in the system of FIG. 1.

FIG. 7 shows a flow chart of the return channel bandwidth limiting process utilized in the system of FIG. 1. Bandwidth limiters are used in system 100 to ensure that a user does not monopolize bandwidth, thereby maintaining fairness in manner bandwidth is allocated. The total bandwidth allocated to a specific user may be limited by a fixed amount of bandwidth every frame. In step 701, the transceivers 109 provide the NOC 113 with information on the amount of backlog that the transceivers 109 possess. The NOC 113, as in step 703, assigns a predetermined minimum amount of bandwidth to each of the active users. This minimum value is configurable depending on the capacity of the system 100 and the number of user terminals 101. Next, the NOC 113 determines whether additional return channel bandwidth is available, per step 705. In the event that this minimal amount of bandwidth does not completely satisfy the requirements of one or more of the transceivers 109, the backlog information of all the transceivers are examined to determine which transceivers 109 are in need of additional return channel bandwidth, per step 707. If bandwidth is available, the NOC 113 checks whether the system can honor all of the bandwidth requirements (as indicated by the backlog information) using a default bandwidth level (step 709). The default bandwidth level is drawn from a set of predetermined bandwidth levels. In an exemplary embodiment, the set of bandwidth levels may be derived from traffic statistics that are gathered from the transceivers 109. If the default level cannot meet the additional bandwidth requirements of the particular transceivers 109, then a bandwidth level is selected from a set of predetermined bandwidth levels according to a predetermined criteria, as in step 711. The predetermined criteria can be specified dynamically by the NOC 113. For example, the NOC 113 may specify the criteria such that the bandwidth level that is nearest the next to the highest backlog is selected. In this manner, any attempts by a single transceiver 109 to excessively consume the available bandwidth are curbed. Steps 709 and 711 may be repeated until a bandwidth level is reached in which some (or all) of the users' backlogs are satisfied across the entire span of users. At which time, the NOC 113 allocates bandwidth to the transceivers 109, as in step 713, based upon the bandwidth level that was set. This approach advantageously ensures that all users receive a minimum amount of bandwidth before high bandwidth users are further bandwidth allocations.

Alternatively, another approach to limit bandwidth is to limit protocols such as ICMP so a user cannot monopolize a channel with PINGs.

Figure 8:
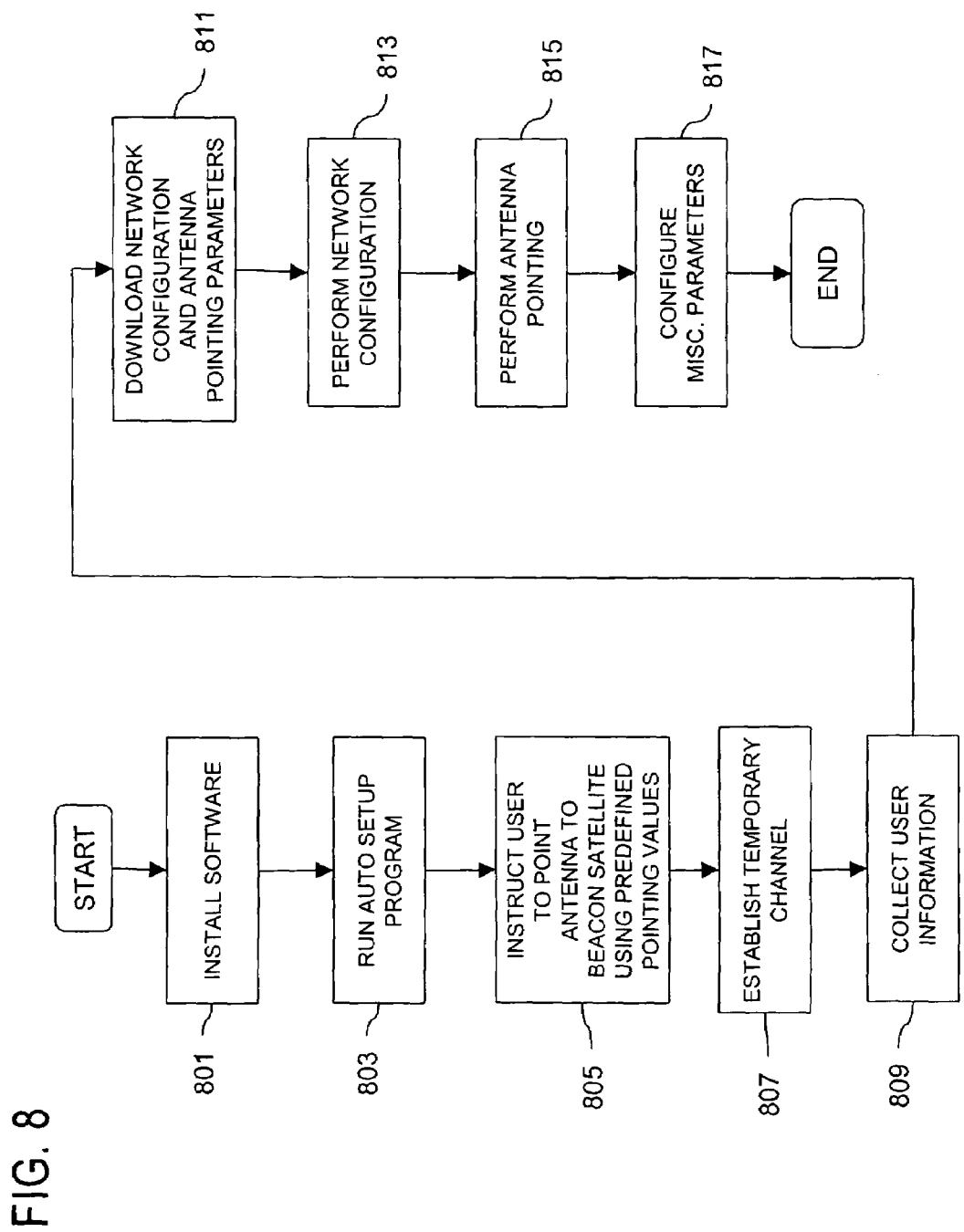
FIG. 8 is a flow chart of the auto-commissioning process utilized in the system of FIG. 1.

FIG. 8 is a flow chart of the auto-commissioning process utilized in the system of FIG. 1. The auto-commissioning process enables the user to be on-line with the system 100 through an automated process that obtain the necessary configuration parameters for the transceiver 109 and ODU 307. The transmit path may be configured through a utility which saves transmission parameters to the PC 101, allows frame timing fine-tuning (referred to as "ranging"), and provides troubleshooting tools for the transmission portion (i.e., ITU 109b) of the transceiver 109. The system 100 provides auto-commissioning without requiring a phone line. The purpose of auto-commissioning is to prepare the system to be operational.

A user may commission the two-way site with no access to a phone line or to the Internet 105. In step 801, the user installs software in the PC 101. The PC 101 executes the auto setup program, as in step 803. For example, when the user starts the setup program from a CD (compact disc), the user may enter location information. To be as user-friendly as possible, the information may be in terms of country, state/province (optional), and city. From this information, the PC 101 may estimate the latitude and longitude of the site and select a two-way "beacon" for the site based upon the information on the CD. The program instructs, as in step 805, the user to point the antenna to the beacon satellite using predefined pointing values. The system 100 provides a default satellite 107 and associated default transponder, whereby a user terminal 101 undergoing the commissioning process may establish communication with the NOC 113.

Upon a successful antenna pointing (and ranging), a temporary channel is established, as in step 807, from the transceiver 109 to the NOC 113 via satellite 107. This temporary channel may support either a connection-oriented or connectionless (e.g., datagram) connection. According to one embodiment of the present invention, the temporary channel carries TCP/IP traffic, thereby permitting the use of a user-friendly web access and file transfer capabilities. The software may be capable of communicating over the system 100 to an "auto-commissioning server" in the NOC 113 to perform the two-way interaction required to sign the user up for two-way access.

In step 809, the NOC 113 collects user information, such as billing and accounting information, user antenna location, and service plan selection. Next, the NOC 113 downloads the network configuration parameters, antenna pointing parameters, and transceiver tuning parameters to the PC 101, per step 811. According to one embodiment of the present invention, the antenna pointing parameters include the following: satellite longitude (East or West), satellite longitude, satellite polarization, satellite polarization offset, and satellite frequency. The transceiver parameters may include a symbol rate, modulation type, framing mode, Viterbi mode, and scramble mode. Next, the PC 101 is configured based upon the received network configuration parameters (step 813). In step 815, the user performs the antenna pointing process, as instructed by the program; this process is more fully described below with respect to FIG. 9. Thereafter, the PC 101 sets various other parameters relating to PC system settings, per step 817 (e.g., default directories for loading packages) and desired applications (e.g., webcast, newscast, etc.).

Figure 9:
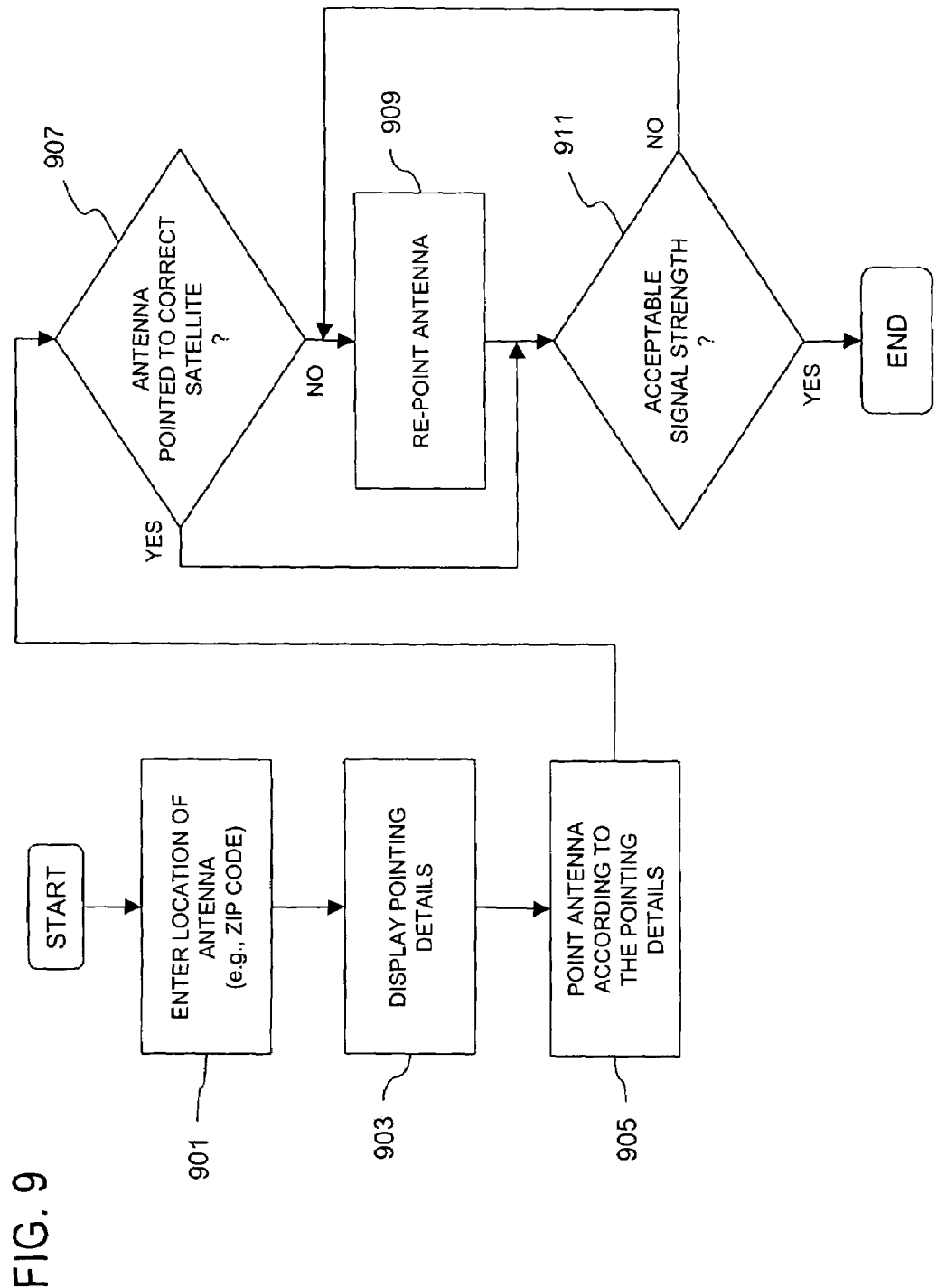
FIG. 9 is a flow chart of the antenna pointing operation associated with the auto-commission process of FIG. 8.

FIG. 9 is a flow chart of the antenna pointing operation associated with the auto-commission process of FIG. 8. In step 901, the user enters the location of the antenna by specifying the ZIP code, for example. Based upon the ZIP code, the setup program displays the antenna pointing details, per step 903. The user then points the antenna, as in step 905, according to the antenna pointing details. Pointing involves physically directing the antenna assembly according to the parameters that are supplied by the setup program For example, the bolts in the antenna assembly may be tightened enough so that the antenna does not move, except the azimuth (horizontally around the pole). The user may adjust the elevation by 0.5 degrees every 2 seconds until the elevation is maximized. Next, the azimuth is gradually moved (1 degree per second) until it is maximized.

The program indicates whether the antenna is pointed to the correct satellite (step 907). If the antenna is not pointed to the correct satellite 107, then the user adjusts the antenna position, per step 909. The user checks whether the antenna is properly position to exhibit an acceptable signal strength, as indicated by the setup program (step 911). This measurement provides digital signal strength for a demodulated carrier. If the signal strength is below an acceptable level, then the user must re-adjust the antenna (step 909). This approach requires another person to read the PC Antenna pointing screen while the antenna is adjusted; alternatively, the user may listen to an audible tone. Upon obtaining an acceptable signal strength, the antenna process ends.

As part of this process, the user may be assigned to a service that may be supported on a different satellite or the same satellite. If the service is on a different satellite, the user may re-point to another satellite and then should automatically be ranged and obtain service.

The IRU 109a supports an AGC (automatic gain control) circuitry in addition to the signal quality factor measurement. The AGC circuitry provides a raw signal strength measurement that indicates that the receiver is receiving energy from a satellite 107. This provides the additional advantage that the signal can be measured prior to the demodulator being locked. However, the circuitry may lead to pointing to the wrong satellite if a nearby satellite has a carrier at the same frequency to which the receiver is tuning to lock to a carrier.

The antenna pointing for the IRU 109a is supported in two different modes. Using voltage emitted from the ODU 307. It requires installation of the transmission equipment, and requires that the user have a voltmeter that can be attached to the ODU 307. The second mode is to use a PC Antenna pointing program, which may be separate from the auto-commissioning setup program This is the approach used when the user either does not have transmission equipment or does not have a voltmeter to attach to the transmit ODU.

The first approach allows a user to be physically present at the antenna, without interaction with the PC while pointing the antenna. This approach assumes that IRU 109a, ITU 109b, power supply 109c, dual IFL 303, and ODU 307 have been properly installed. A voltmeter that measures, for example, 0–10 volts may be used.

The user performing the antenna pointing process may start the pointing program from the host PC 101. This software places the equipment in a mode where, instead of transmitting any user traffic, it places the transmission equipment in a mode where voltage is supplied to the ODU 307 to emit on an F-connector on the back of the ODU 307. This program also supplies an approximation of the pointing parameters for the antenna. These values should be written and used to point the ODU. The voltage on the F-connector can be interpreted as follows. The voltage range of 0–4V indicates an AGC level. The higher the voltage, the stronger the signal. When the voltage is in this range, the modulator is not locked. If the signal remains over 3V for over 10 seconds, then it is likely that the antenna is pointed to the wrong satellite. A voltage of 5V indicates a lock to an outroute that does not match the commissioned characteristics. The most probable cause is pointing to an incorrect, adjacent satellite, which can be corrected by minor azimuth changes. The voltage range of 6–10V specifies an SQF Value, in which the higher the voltage, the stronger the signal. A value of 8.0 may equate to an SQF of 100, which is the minimal acceptable level for an installation.

Figure 10:
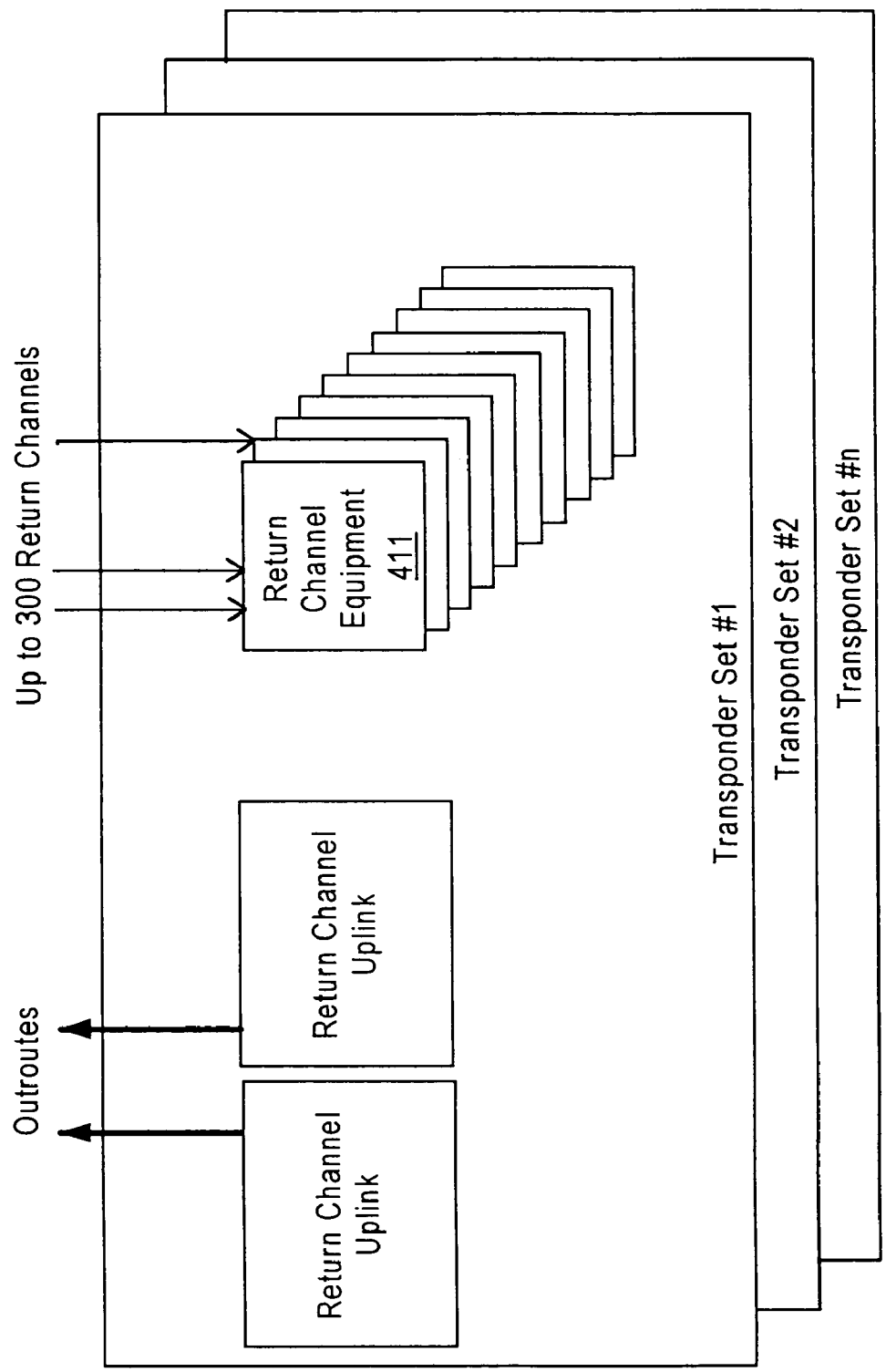
FIG. 10 is a diagram showing the scalable architecture of the system of FIG. 1.

FIG. 10 is a diagram showing the scalability of the system of FIG. 1. The system 100, according to an embodiment of the present invention, can scale to accommodate millions of customers. Conceptually, the resources of the system 100 is subdivided numerous times until a small number of users are sharing a small number of resources. The layers to scaling are as follow: (1) system, (2) transponder-sets, (3) Return Channel Equipment, and (4) Return Channel. At the system layer, an extremely large number of users can be supported. For the transponder-sets, two or more outroutes may be supported; therefore, more than two sets of Return Channel Equipment 411a re used at this layer. The transponder set also includes the necessary equipment to support a transponder's worth of return channels, supporting up to 100,000 users. At the Return Channel Equipment layer, which includes up to 31 return channels, a set of users are configured to each set of RCE 411 during ranging time. This configuration may also be dynamically switched. At the Return Channel layer, when a user becomes active, the user may be assigned bandwidth on a specific return channel. Up to 16 active users may be supported per 64 kbps return channel.

The above scalable configuration is described from a "bottom up" point of view, starting with the return channel to the system level. The Return Channel uplink is a standard NOC 113 with the additional timing unit equipment required to perform timing on each transponder. This may require the standard NOC infrastructure, including hybrid gateways, satellite gateways, and uplink redundancy. In addition, a Portion of one rack for additional equipment is required. Two Timing Units are used per uplink transponder (each with 2 IRUs). A System IF Distribution module 403 to distribute return channel signal to the RCE sets. A portmaster may also be needed to support the serial connections to do monitor and control of the 10 sets of BCDs. It should be noted that RS232 limitations may require the portmaster to be within 60 feet of all RCE equipment sets.

The return channel equipment 411 receives the data from the return channels and prepares the packets to be sent to the appropriate hybrid gateways 419. The Return Channel Equipment 411 includes the following for 30 return channels: 3 BCD Racks; 8 BCD Chassis, each with 4 power supplies; cards required to properly connect 8 BCD chassis to the NC-Bus, Redundancy Bus, and M&C Bus; Network IF Distribution; 32 sets of BCD equipment; and two NCCs 411a (e.g., PCs with TxRx).

Figure 11:
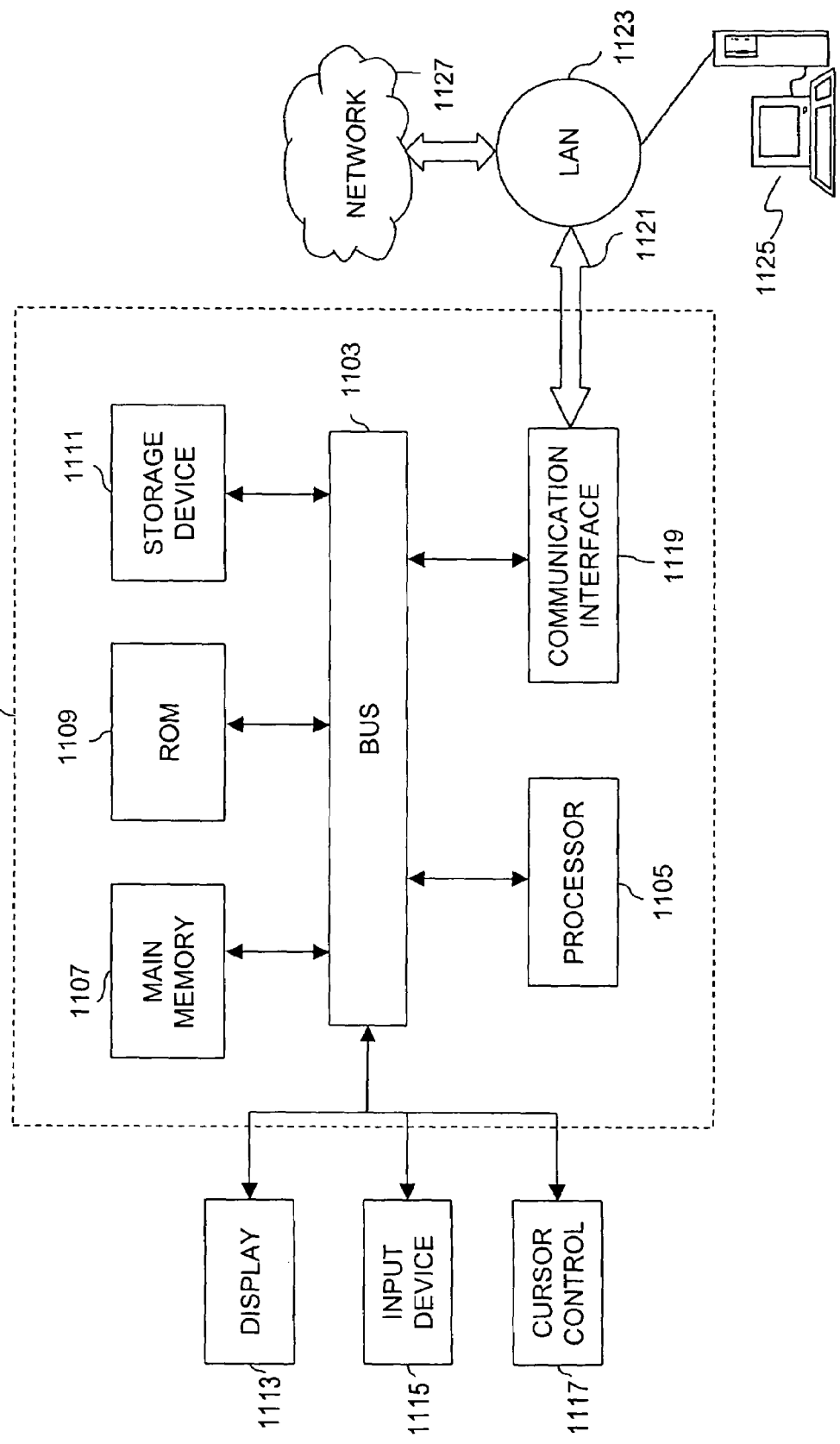
FIG. 11 is a diagram of a computer system that can support the interfaces for two-way satellite communication, in accordance with an embodiment of the present invention.

FIG. 11 is a diagram of a computer system that can execute and support the system interfaces and protocols of system 100, in accordance with an embodiment of the present invention. Computer system 1101 includes a bus 1103 or other communication mechanism for communicating information, and a processor 1105 coupled with bus 1103 for processing the information. Computer system 1101 also includes a main memory 1107, such as a random access memory (RAM) or other dynamic storage device, coupled to bus 1103 for storing information and instructions to be executed by processor 1105. In addition, main memory 1107 may be used for storing temporary variables or other intermediate information during execution of instructions to be executed by processor 1105. Computer system 1101 further includes a read only memory (ROM) 1109 or other static storage device coupled to bus 1103 for storing static information and instructions for processor 1105. A storage device 1111, such as a magnetic disk or optical disk, is provided and coupled to bus 1103 for storing information and instructions.

Computer system 1101 may be coupled via bus 1103 to a display 1113, such as a cathode ray tube (CRT), for displaying information to a computer user. An input device 1115, including alphanumeric and other keys, is coupled to bus 1103 for communicating information and command selections to processor 1105. Another type of user input device is cursor control 1117, such as a mouse, a trackball, or cursor direction keys for communicating direction information and command selections to processor 1105 and for controlling cursor movement on display 1113.

According to one embodiment, interaction within system 100 is provided by computer system 1101 in response to processor 1105 executing one or more sequences of one or more instructions contained in main memory 1107. Such instructions may be read into main memory 1107 from another computer-readable medium such as storage device 1111. Execution of the sequences of instructions contained in main memory 1107 causes processor 1105 to perform the process steps described herein. One or more processors in a multi-processing arrangement may also be employed to execute the sequences of instructions contained in main memory 1107. In alternative embodiments, hard-wired circuitry may be used in place of or in combination with software instructions. Thus, embodiments are not limited to any specific combination of hardware circuitry and software.

Further, the instructions to support the system interfaces and protocols of system 100 may reside on a computer-readable medium The term "computer-readable medium" as used herein refers to any medium that participates in providing instructions to processor 1105 for execution. Such a medium may take many forms, including but not limited to, non-volatile media, volatile media, and transmission media. Non-volatile media includes, for example, optical or magnetic disks, such as storage device 1111. Volatile media includes dynamic memory, such as main memory 1107. Transmission media includes coaxial cables, copper wire and fiber optics, including the wires that comprise bus 1103. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1105 for execution. For example, the instructions may initially be carried on a magnetic disk of a remote computer. The remote computer can load the instructions relating to the system interfaces and protocols of system 100 remotely into its dynamic memory and send the instructions over a telephone line using a modem A modem local to computer system 1101 can receive the data on the telephone line and use an infrared transmitter to convert the data to an infrared signal. An infrared detector coupled to bus 1103 can receive the data carried in the infrared signal and place the data on bus 1103. Bus 1103 carries the data to main memory 1107, from which processor 1105 retrieves and executes the instructions. The instructions received by main memory 1107 may optionally be stored on storage device 1111 either before or after execution by processor 1105.

Computer system 1101 also includes a communication interface 1119 coupled to bus 1103. Communication interface 1119 provides a two-way data communication coupling to a network link 1121 that is connected to a local network 1123. For example, communication interface 1119 may be a network interface card to attach to any packet switched local area network (LAN). As another example, communication interface 1119 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1119 sends and receives electrical, electromagnetic or optical signals that carry digital data streams representing various types of information.

Network link 1121 typically provides data communication through one or more networks to other data devices. For example, network link 1121 may provide a connection through local network 1123 to a host computer 1125 or to data equipment operated by a service provider, which provides data communication services through a communication network 1127 (e.g., the Internet). LAN 1123 and network 1127 both use electrical, electromagnetic or optical signals that carry digital data streams. The signals through the various networks and the signals on network link 1121 and through communication interface 1119, which carry the digital data to and from computer system 1101, are exemplary forms of carrier waves transporting the information. Computer system 1101 can transmit notifications and receive data, including program code, through the network(s), network link 1121 and communication interface 1119.

The techniques described herein provide several advantages over prior approaches to providing access to the Internet. Multiple transceivers are employed with the capability to transmit backlog information over a return channel via a satellite, wherein the backlog information specify an amount of queued traffic for the respective transceivers. A hub receives the backlog information and allocates a minimal amount of return channel bandwidth to each of the transceivers. The hub sets a bandwidth level associated with the return channel bandwidth that is available based upon a bandwidth level from a set of predetermined bandwidth levels, according to a predetermined criteria. The hub selectively allocates additional return channel bandwidth based upon the bandwidth level to the transceivers that require additional return channel bandwidth in excess of the allocated minimal amounts. Under this approach, return channel bandwidth can be managed efficiently.

Obviously, numerous modifications and variations of the present invention are possible in light of the above teachings. It is therefore to be understood that within the scope of the appended claims, the invention may be practiced otherwise than as specifically described herein.

What is claimed is:

1. A method for managing return channel bandwidth in a two-way satellite communication system, the method comprising:
receiving backlog information from at least one of a plurality of transceivers, the backlog information specifying an amount of queued traffic for the respective transceivers;
allocating a minimal amount of return channel bandwidth to each of the plurality of transceivers;
selectively setting a bandwidth level associated with the return channel bandwidth that is available based upon one of a plurality of predetermined bandwidth levels according to a predetermined criteria; and
selectively allocating additional return channel bandwidth based upon the bandwidth level to the transceivers that require additional return channel bandwidth in excess of the allocated minimal amounts; and
wherein the plurality of predetermined bandwidth levels are based upon traffic statistics of the plurality of transceivers; and
wherein the predetermined criteria in the step of selectively setting the bandwidth level specify that one of the plurality of bandwidth levels corresponds to a next largest backlog.

2. The method according to claim 1, wherein the receiving step comprises:
receiving an inroute packet from each of the plurality of transceivers, the inroute packets including the backlog information.

3. The method according to claim 2, wherein the inroute packet includes a Backlog field that specifies the backlog information in bytes.

4. The method according to claim 3, further comprising:
transmitting an inroute acknowledgement packet in response to the received inroute packet.

5. The method according to claim 1, wherein each of the steps of allocating comprises transmitting a bandwidth allocation packet that specifies a respective bandwidth allocation.

6. The method according to claim 1, wherein the plurality of transceivers are grouped as inroute groups.

7. A system for managing return channel bandwidth in a two-way satellite communication system, the system comprising:
a plurality of transceivers configured to transmit backlog information over a return channel via a satellite, the backlog information specifying an amount of queued traffic for the respective transceivers; and
a hub configured to receive the backlog information and to allocate a minimal amount of return channel bandwidth to each of the plurality of transceivers.
wherein the hub selectively sets a bandwidth level associated with the return channel bandwidth that is available based upon one of a plurality of predetermined bandwidth levels according to a predetermined criteria, the hub selectively allocating additional return channel bandwidth based upon the bandwidth level to the transceivers that require additional return channel bandwidth in excess of the allocated minimal amounts; and
wherein the plurality of predetermined bandwidth levels are based upon traffic statistics of the plurality of transceivers; and
wherein the predetermined criteria specifies that one of the plurality of bandwidth levels corresponds to a next largest backlog.

8. The system according to claim 7, wherein the hub receives the backlog information via inroute packets.

9. The system according to claim 8, wherein the inroute packet includes a Backlog field that specifies the backlog information in bytes.

10. The system according to claim 9, wherein the hub transmits an inroute acknowledgement packet in response to the received inroute packet.

11. The system according to claim 7, wherein the hub transmits a bandwidth allocation packet that specifies a respective bandwidth allocation.

12. The system according to claim 7, wherein the plurality of transceivers are grouped as inroute groups.

13. A system for managing return channel bandwidth in a two-way satellite communication network, the system comprising:
means for receiving backlog information from a plurality of transceivers, the backlog information specifying an amount of queued traffic for the respective transceivers;
means for allocating a minimal amount of return channel bandwidth to each of the plurality of transceivers;
means for selectively setting a bandwidth level associated with the return channel bandwidth that is available based upon one of a plurality of predetermined bandwidth levels according a predetermined criteria; and
means for selectively allocating additional return channel bandwidth based upon the bandwidth level to the transceivers that require additional return channel bandwidth in excess of the allocated minimal amounts; and
wherein the plurality of predetermined bandwidth levels are based upon traffic statistics of the plurality of transceivers; and
wherein the predetermined criteria specify that one of the plurality of bandwidth levels corresponds to a next largest backlog.

14. The system according to claim 13, wherein the receiving means receives an inroute packet from each of the plurality of transceivers, the inroute packets including the backlog information.

15. The system according to claim 14, wherein the inroute packet includes a Backlog field that specifies the backlog information in bytes.

16. The system according to claim 15, further comprising:
means for transmitting an inroute acknowledgement packet in response to the received inroute packet.

17. The system according to claim 13, further comprising:
means for transmitting a bandwidth allocation packet that specifies a respective bandwidth allocation.

18. The system according to claim 13, wherein the plurality of transceivers are grouped as inroute groups.

19. A computer-readable medium carrying one or more sequences of one or more instructions for managing return channel bandwidth in a two-way satellite communication system, the one or more sequences of one or more instructions including instructions which, when executed by one or more processors, cause the one or more processors to perform the steps of:
receiving backlog information from a plurality of transceivers, the backlog information specifying an amount of queued traffic for the respective transceivers;
allocating a minimal amount of return channel bandwidth to each of the plurality of transceivers;
selectively setting a bandwidth level associated with the return channel bandwidth that is available based upon one of a plurality of predetermined bandwidth levels according to a predetermined criteria; and selectively allocating additional return channel bandwidth based upon the bandwidth level to the transceivers that require additional return channel bandwidth in excess of the allocated minimal amounts; and wherein the plurality of predetermined bandwidth levels in the step of selectively setting the bandwidth level are based upon traffic statistics of the plurality of transceivers; and wherein the predetermined criteria in the step of selectively setting the bandwidth level specify that one of the plurality of bandwidth levels corresponds to a next largest backlog.

20. The computer readable-medium according to claim 19, wherein the receiving step comprises:

receiving an inroute packet from each of the plurality of transceivers, the inroute packets including the backlog information.

21. The computer readable-medium according to claim 20, wherein the inroute packet includes a Backlog field that specifies the backlog information in bytes.

22. The computer readable-medium according to claim 21, further comprising:

transmitting an inroute acknowledgement packet in response to the received inroute packet.

23. The computer readable-medium according to claim 19, wherein each of the steps of allocating comprises transmitting a bandwidth allocation packet that specifies a respective bandwidth allocation.

24. The computer readable-medium according to claim 19, wherein the plurality of transceivers are grouped as inroute groups.

* * * * *